(12) United States Patent
Lawson

(10) Patent No.: US 8,337,159 B2
(45) Date of Patent: Dec. 25, 2012

(54) AIRFOILS WITH AUTOMATIC PITCH CONTROL

(76) Inventor: David Lawson, Winchelsea (GB)

( * ) Notice: Subject to any disclaimer, the term of this patent is extended or adjusted under 35 U.S.C. 154(b) by 807 days.

(21) Appl. No.: 12/526,588

(22) PCT Filed: Feb. 7, 2008

(86) PCT No.: PCT/GB2008/000447
§ 371 (c)(1),
(2), (4) Date: Aug. 10, 2009

(87) PCT Pub. No.: WO2008/096154
PCT Pub. Date: Aug. 14, 2008

(65) Prior Publication Data
US 2010/0028150 A1    Feb. 4, 2010

(30) Foreign Application Priority Data
Feb. 9, 2007 (GB) .................................. 0702552.1

(51) Int. Cl.
*F01D 5/00* (2006.01)
(52) U.S. Cl. ........................................ 416/131; 416/141
(58) Field of Classification Search ............ 416/131, 416/132 B, 141
See application file for complete search history.

(56) References Cited

U.S. PATENT DOCUMENTS

| | | | | |
|---|---|---|---|---|
| 4,383,801 A | * | 5/1983 | Pryor | 416/17 |
| 5,193,978 A | * | 3/1993 | Gutierrez | 416/24 |
| 5,676,524 A | * | 10/1997 | Lukas | 416/17 |
| 7,083,382 B2 | * | 8/2006 | Ursua | 416/110 |
| 2004/0057830 A1 | | 3/2004 | Boatner | |
| 2009/0136346 A1 | * | 5/2009 | Kelly | 416/131 |

FOREIGN PATENT DOCUMENTS

| | | |
|---|---|---|
| CA | 2365650 A1 | 6/2003 |
| GB | 2417758 A | 3/2006 |
| WO | 0238954 A1 | 5/2002 |
| WO | 2004022856 A1 | 3/2004 |
| WO | 2004110859 A1 | 12/2004 |
| WO | 2005024226 A1 | 3/2005 |

* cited by examiner

*Primary Examiner* — Dwayne J White
(74) *Attorney, Agent, or Firm* — Brooks Kushman P.C.

(57) ABSTRACT

An airfoil arranged for use in a fluid flow of varying direction relative to the airfoil, has arranged thereon a plural axis hinge for automatic adjustment of the angle of pitch of the airfoil. The airfoil can be applied to a rotary crossflow device for use in a fluid flow of varying apparent flow direction, an oscillating device for use in a fluid flow, a force generation device for use in a fluid flow of varying direction, or a flow control device for use in a fluid flow of alternating direction.

28 Claims, 28 Drawing Sheets

(a)

(b)

(a)

(b)

(c)

AIRFOILS WITH AUTOMATIC PITCH CONTROL

The present invention relates to an airfoil arranged for use in a fluid flow of varying direction relative to the airfoil. The invention also extends to a rotary crossflow device, to an oscillating device, to a force generation device, and to a flow control device.

Proposals have been made for the use of rotary crossflow devices as power generators in freely flowing fluid such as tidal flows, and as propulsors or propellers.

Rotary crossflow devices have a rotational axis which is perpendicular to the flow direction and have been shown to be theoretically more efficient than the pre-eminent rotary axial turbine/propeller devices. Rotary crossflow devices have the advantage of being able to cover a large rectangular swept area, and when used as power generators, have the inherent advantage of the drive train being locatable above water level.

However, the potential efficiency of rotary crossflow devices has been largely unachievable in practice due to the highly complex fluid flow field with which such a device must contend. During operation, the foils of such rotary crossflow power generating devices encounter a continually changing apparent flow direction which alternates either side of a line tangential to the arc of rotation of the foil (or blade) and which also continually changes in speed. In order for such rotary crossflow devices to work best in fluid flows such as a tidal flow, effective pitch control of the rotary foils or blades is needed in order to avoid foil stalling at lower tip speed ratios.

Furthermore, due to the complexity of the flow encountered by the foils, which are sometimes referred to herein as airfoils, the pitch control should ideally accommodate the full complexity of the flow regime encountered.

Rotary crossflow turbines with fixed pitch foils are well known in the art.

The foils of these devices may operate close to the desired "angle of attack" (hereinafter referred to as "AOA") at high tip speed ratios, but in fast moving flows, the high apparent flow speeds can create very high lift forces and damaging loads on the foils or cause cavitation. Also, the foils of these devices stall at lower tip speed ratios and require a motor to start the device and to bring it up to operational speed.

Mechanical variable pitch control mechanisms have been proposed for rotary crossflow turbines. These mechanisms vary the pitch of a pivoted foil generally sinusoidally throughout a rotation of the device. However, different tip speed ratios require different amplitudes and, in an alternating flow such as a tidal flow, phase shifting due to the changes in tidal direction is also required. These pitch control systems assume constant flow speed and parallel flow through the turbine which greatly oversimplifies the flow encountered by the foils. Furthermore, these devices require elaborate and sophisticated control systems which can be costly and potentially unreliable.

Various fluid dynamic automatic pitch control mechanisms have also been proposed in which a blade or foil may pivot about a single pivot point. The pivot point is displaced some small distance either ahead of or behind the foil's aerodynamic centre, and the moment generated about the pivot by the lift and drag force on the foil is resisted in various ways in order to maintain the foil at an operational AOA. This approach is problematical because the magnitude of the moment is influenced not only by the apparent flow direction but by the apparent flow speed as well, and this is highly changeable throughout rotation. The AOA is thus continually changed from the desired AOA, requiring a sophisticated control system to counter it.

It is therefore an aim of the present invention to at least alleviate some of the problems of the prior art.

Accordingly, the invention is as set out in the attached claims.

According to a first aspect of the invention, there is provided an airfoil arranged for use in a fluid flow of varying flow direction relative to the airfoil, the airfoil being arranged on a plural axis hinge for automatic adjustment of the angle of pitch thereof.

An advantage of the invention is that automatic pitch control of the airfoil is provided that is effective when the airfoil experiences a varying or alternating apparent flow direction. The airfoil pitch is responsive solely to the fluid dynamic forces of the fluid flow in which the airfoil is disposed and a plural axis hinge may operate to alter the pitch of the airfoil only when it is required. Furthermore the plural axis hinge can respond to the full complexity of the flow regime under all conditions of the flow. A plural axis hinge provides pitch control without the need for an external control system or external machinery. The absence of external machinery and control systems produces a compact automatic pitch control solution which is also substantially cheaper than the prior art systems.

The plural axis hinge may comprise a fixed component defining first and second laterally spaced pivot centres, and a moving component that is pivotable about each of the first and second pivot centres to open the hinge, the airfoil being disposed on the moving component for pivoting movement therewith. In this manner, the pitch of the airfoil is automatically adjustable with the moving component of the hinge, depending on the apparent flow direction experienced by the airfoil.

Alternatively, the plural axis hinge may comprise a fixed component and a moving component, the moving component being pivotable about each of a first pivot centre and a second pivot centre laterally spaced from the first pivot centre, to cause the hinge to open about either of the first or second pivot centres, and in which the position of each of the first pivot centre and second pivot centre is changeable with respect to the fixed component during opening of the hinge, the airfoil being disposed on the moving component for pivoting movement therewith.

The action of the moving component during a transition of the hinge being open about one of the first and second pivot centres and being open about the other of the first and second pivot centres may be substantially immediate.

Alternatively, the hinge action may be gradual rolling movement.

The moving component may be arranged to pivot about a plurality of intermediate pivot centres during transitional movement between the first pivot centre and second pivot centre.

The plural axis hinge may further comprise cross-links extending between the fixed component and moving component at each of the first and second pivot centres. The cross-links provide a means of securing together the fixed component and the moving component of the plural axis hinge whilst allowing the hinge to be opened about either of the first and second pivot centres. The cross-links may be substantially rigid or they may be flexible. With each type of cross-link, the construction of the hinge can be such that the transition between the hinge being open about the first pivot centre and the hinge being open about the second pivot centre can be sudden and immediate or it can be a more gradual rolling process.

Alternatively, a latch mechanism may be provided to secure the components whilst enabling transition of the moving component between the first pivot centre and second pivot centre. This embodiment has the advantage that the hinge height can be reduced, reducing the frontal area of the hinge and correspondingly reducing the drag force produced by the hinge. The latch may be controllable by a directional vane or it may be controllable via a pressure actuated switch. In each of these embodiments, the control of the latch ensures that the plural axis hinge pivots only about the windward pivot under normal operational conditions of the device using the hinge.

In an embodiment, the plural axis hinge may further comprise at least one hydraulic damper connected to the movable component. The presence of the damper can prevent the hinge components becoming stressed at tip speed ratios at which gybing occurs. There may be provided a hydraulic damper connected to the movable component at each of the first and second pivot centres.

Where a hydraulic damper is connected to the movable component at each of the first and second pivot centres, these may further be used instead of cross-links or a latch mechanism to secure the hinge components whilst enabling transition of the moving component between the first pivot centre and second pivot centre. This embodiment also has the advantage that the hinge height can be reduced, reducing the frontal area of the hinge and correspondingly reducing the drag force produced by the hinge.

The hydraulic damper(s) may have a varying damping rate. To ease the shock loads on the hinge, damping is mainly required as the hinge reaches its fully open or closed positions, with little damping requirement between these positions.

Actuation of the hydraulic damper(s) may be delayed by a time delay device. Such a device can also ensure that the hinge pivots only about the windward pivot under normal operational conditions of the device using the hinge.

Where a hydraulic damper is connected to the moveable component at each of the first and second pivot centres, an automatic selector may be used to determine which damper is to be operated at any one time. In this manner, the presence of the hydraulic dampers can also ensure that the hinge pivots only about the windward pivot under normal operational conditions of the device using the hinge. The automatic selector may comprise a rotary valve, or a linear valve. The automatic selector may be controllable by a directional vane or may be controllable via a pressure-actuated switch.

It may be arranged to limit the opening extent of the moveable component of the plural axis hinge from the fixed component. In an embodiment, the hydraulic damper(s) are used for this purpose, although other means may be employed. Rotary crossflow power generators require a brake or lock to maintain the generator in a stationary position whilst the current flows so that drive train maintenance etc. can be carried out. To minimise the size of the brake, it is desirable to reduce the stationary start up torque of the generator. Limiting the hinge opening angle to a maximum of about 30 degrees also limits the foil pitch, and the start up torque generated by the foil.

The fluid may be water. The fluid flow may vary in direction such as a tidal flow, may be orbital such as the orbital motion of water in waves, or the flow direction may be generally constant such as river flow, or ocean current.

In an embodiment, the airfoil may comprise a leading edge and a trailing edge, in which, under normal operational conditions of the device using the airfoil, the leading edge always faces the oncoming flow direction and the trailing edge always faces away from the flow direction. Such an airfoil is hereinafter referred to as a 'tacking' foil. A tacking foil may be formed generally as a thin flat blade or as a symmetric airfoil section or as a thin cambered blade or as a cambered airfoil section.

A pivot centreline of the plural axis hinge may be defined as a virtual line passing through the first and second pivot centres, and in which the hinge is mounted to the tacking foil such that when the hinge is closed the pivot centreline is disposed substantially perpendicularly to a chord of the airfoil. The plural axis hinge may be mounted to the tacking foil such that the pivot centreline may pass within +/−25% of a chord width of an aerodynamic centre of the airfoil. Furthermore, the pivot centreline may pass within +/−10% of a chord width of the aerodynamic centre of the airfoil. At these positions there is a higher chance of balancing the airfoil at the required design AOA for a specific airfoil. The exact position is mainly determined by the airfoil lift-drag ratio and as such the ideal mounting position can vary but is usually found to be within these bounds.

In an alternative embodiment, the airfoil may comprise opposing surfaces, and a leading edge and a trailing edge which are arranged to alternate during use thereof to ensure that the surface of the airfoil facing the generally higher fluid pressure always remains the same and the surface facing the lower fluid pressure always remains the same. Such an airfoil is hereinafter referred to as a 'shunting' foil. A shunting foil may be formed generally as a thin flat plate or as a symmetric lenticular section or as a thin cambered plate or as a cambered lenticular section.

A pivot centreline of the plural axis hinge may be defined as a virtual line passing through the first and second pivot centres, and the hinge may be mounted to the shunting foil such that when the hinge is closed the pivot centreline is disposed substantially parallel to a chord of the airfoil.

According to a second aspect of the invention, there is provided a rotary crossflow device for use in a fluid flow of varying apparent flow direction, the device comprising a rotor shaft aligned substantially perpendicularly to the fluid flow, and at least one tacking foil pivotally arranged in parallel with the shaft, the airfoil being disposed in spaced relationship from the shaft on a support connected to the shaft, and the airfoil being arranged on a plural axis hinge in accordance with the first aspect of the invention.

The rotary crossflow device may be a rotary crossflow power generator. In this embodiment, the plural axis hinge may be mounted rigidly to the support such that the transverse axis thereof remains closely or substantially tangential to the arc of rotation of the airfoil during use of the device.

The rotary crossflow device may be a rotary crossflow propeller. In this embodiment the plural axis hinge may be mounted pivotally to the support such that a transverse axis of the plural axis hinge is arranged to remain aligned in accordance with the desired direction of thrust.

The movable component of the plural axis hinge may be mounted on the airfoil so as to be upstream of the fixed component under normal operational conditions of the device using the airfoil. This configuration is suitable for use with rotary crossflow devices and with oscillating propulsors.

In accordance with a third aspect of the invention, an oscillating device is provided for use in a fluid flow of varying apparent flow direction, the device comprising a reciprocating element and at least one airfoil arranged on the reciprocating element such that, as the reciprocating element is at its mid-stroke position and the hinge is in its fully closed position, a chord thereof is disposed substantially parallel to the mean fluid flow direction where the airfoil is a tacking foil, or substantially perpendicular to the mean flow direction where the airfoil is a shunting foil, the airfoil being arranged on a plural axis hinge in accordance with the first aspect of the invention.

The oscillating device may be a power generator. Alternatively the device may be a propulsor. Where the device is a power generator, the movable component of the plural axis hinge may be mounted on the airfoil so as to be downstream of the fixed component.

According to a fourth aspect of the invention, there is provided a force generation device for use in a fluid flow of alternating direction, the device comprising a shunting foil being arranged on a pivoting hinge for automatic adjustment of the angle of pitch thereof.

According to a fifth aspect of the invention, there is provided a flow control device for use in a fluid flow of alternating flow direction, the device comprising a shunting foil being arranged on a pivoting hinge for automatic adjustment of the angle of pitch thereof.

The pivoting hinge of the force generation device and/or flow control device may be a plural axis hinge comprising a fixed component defining first and second laterally spaced pivot centres, and a moving component that is pivotable about each of the first and second pivot centres, the airfoil being disposed on the moving component for pivoting movement therewith. The hinge may include a pivot centreline defined as a virtual line passing through the first and second pivot centres, and in which the hinge is mounted such that, when the hinge is in a fully closed position, the pivot centreline lies substantially parallel with a chord of the airfoil. Such a configuration can be used in confined locations such as ducting between closely spaced turbines.

The force generation device and/or flow control device may further comprise limiting means to limit the angle of pitch of the airfoil. The limiting means is used to maintain the airfoil at the design AOA of the device.

The pivot centreline of a force generation device and/or flow control device may be co-linear with a chord of the airfoil, or the pivot centreline may be offset from a chord of the airfoil. This distance, together with the hinge span (defined as the distance between the hinge's first and second pivot centres), can be designed to ensure that the pitch of the foil reaches its limit at the design AOA.

Alternatively, the hinge of the force generation device and/or flow control device may have a single pivot axis, which may be offset from a chord of the airfoil. Such a configuration can be used in unconfined applications, for example on a force generation device such as a downforce producing device, or on a flow control device in an unconfined location. The distance of the offset of the hinge from the airfoil influences the ability of the foil to reach its limit at the design AOA.

The airfoil of the force generation device and/or flow control device may be cambered.

The force generation device and/or flow control device may comprise an additional external force that is provided as an aid to adjusting the angle of pitch of the airfoil. Such an additional force may be necessary to turn the airfoil from a negative pitch angle to a zero pitch angle so that fluid dynamic forces can then take over to turn the airfoil naturally to the new negative pitch angle relative to the changed flow direction. The additional external force may comprise a hydraulic ram.

The force generation device and/or flow control device may be used in a tidal flow.

The force generation device and/or flow control device may be provided adjacent a rotary crossflow power generator.

A pair of flow control devices may be advantageously used on opposite sides of and adjacent to a rotary crossflow power generator to enhance the flow rate through the generator. When the tide flows in one direction, the foils can be pitched to an AOA so as to create a diffusing duct downstream of the generator. When the tide turns, what was the downstream side of the generator then becomes the upstream side. The pitch of the foils can be changed so as to produce a diffusing duct in the opposite direction without the need to yaw the duct through 180 degrees, saving significant space and costs.

Equally advantageously, there may be a plural number or array of rotary crossflow power generators, in which a pair of the flow control devices is provided in close proximity to one another in a gap between adjacent generators. For example, in a free-flow tidal array of generators, a likely problem is that a head of water will build up between the upstream and downstream sectors of the array, tending to divert the flow around the sides of the array rather than through the generators. When the present invention is provided between adjacent generators, the pair of flow control devices form a venturi-like passage which may also/further enhance the flow rate through the array.

It will be apparent to the skilled person that the invention lies in the alternating action of the plural axis hinge under fluid dynamic pressure and that the invention may be carried out in a number of different ways. A number of specific constructions described herein are intended as non-limiting exemplary embodiments and will now be described with reference to the accompanying drawings in which.

Figure 4:
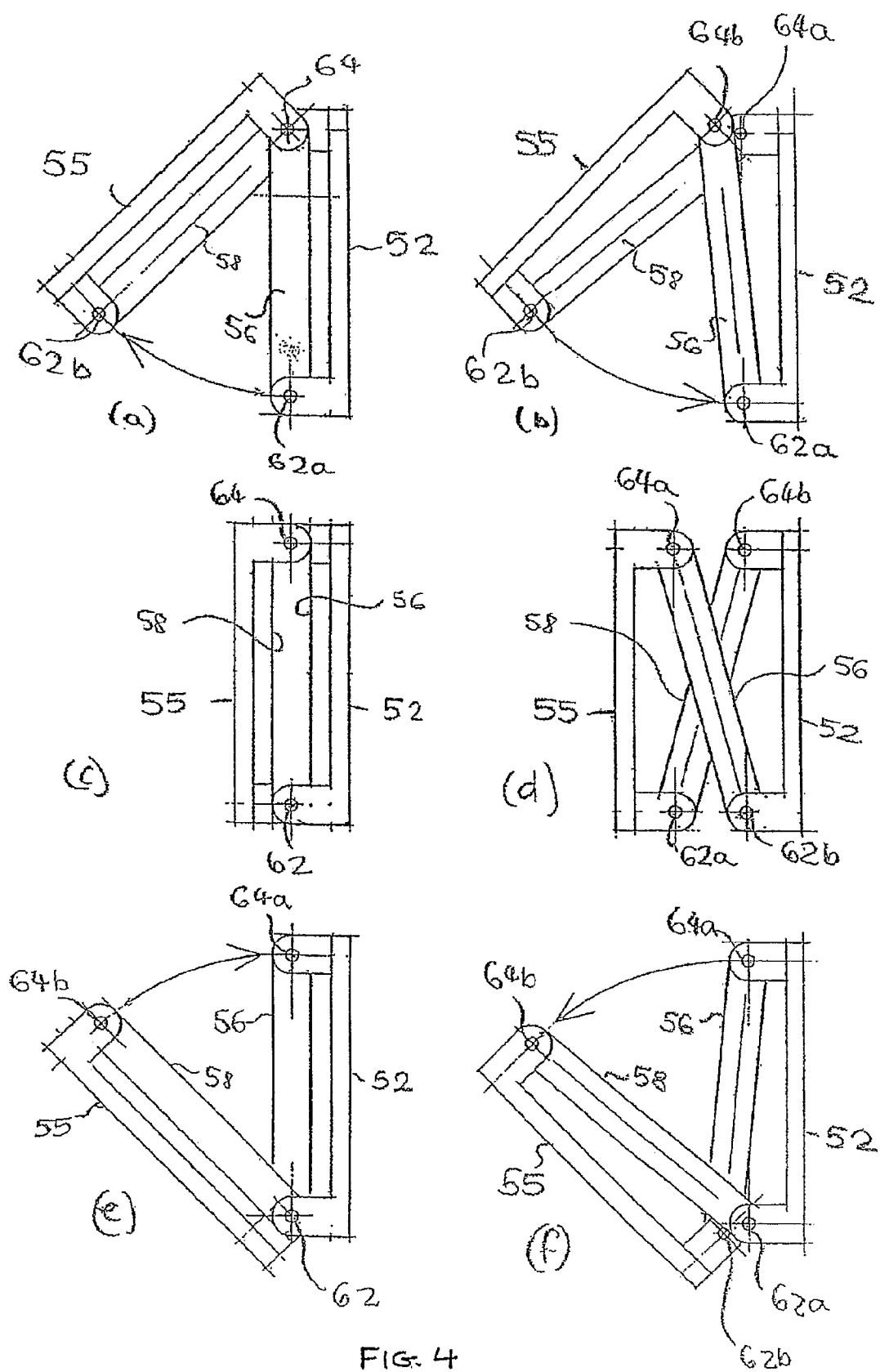
Figure 5:
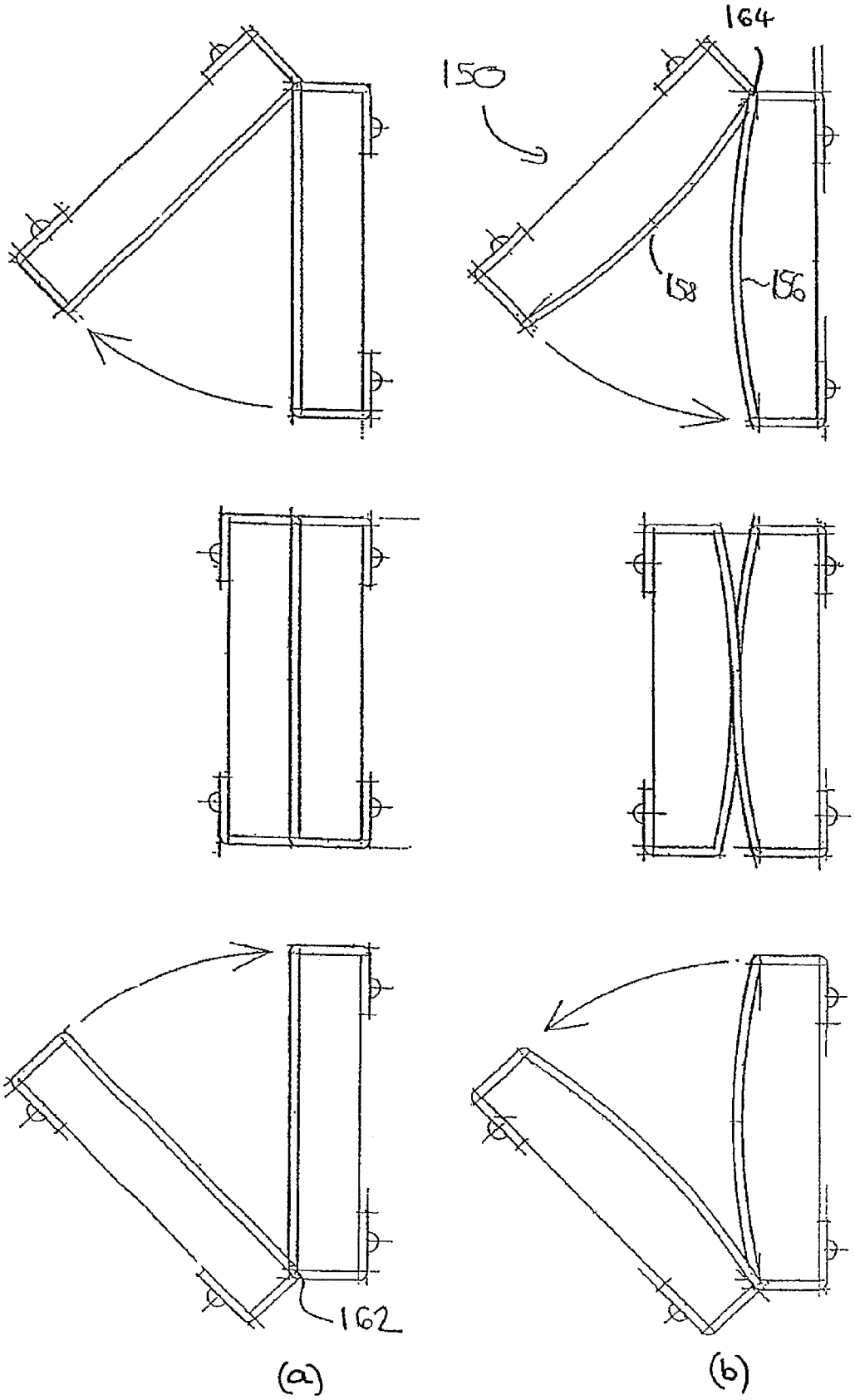
Figure 6:
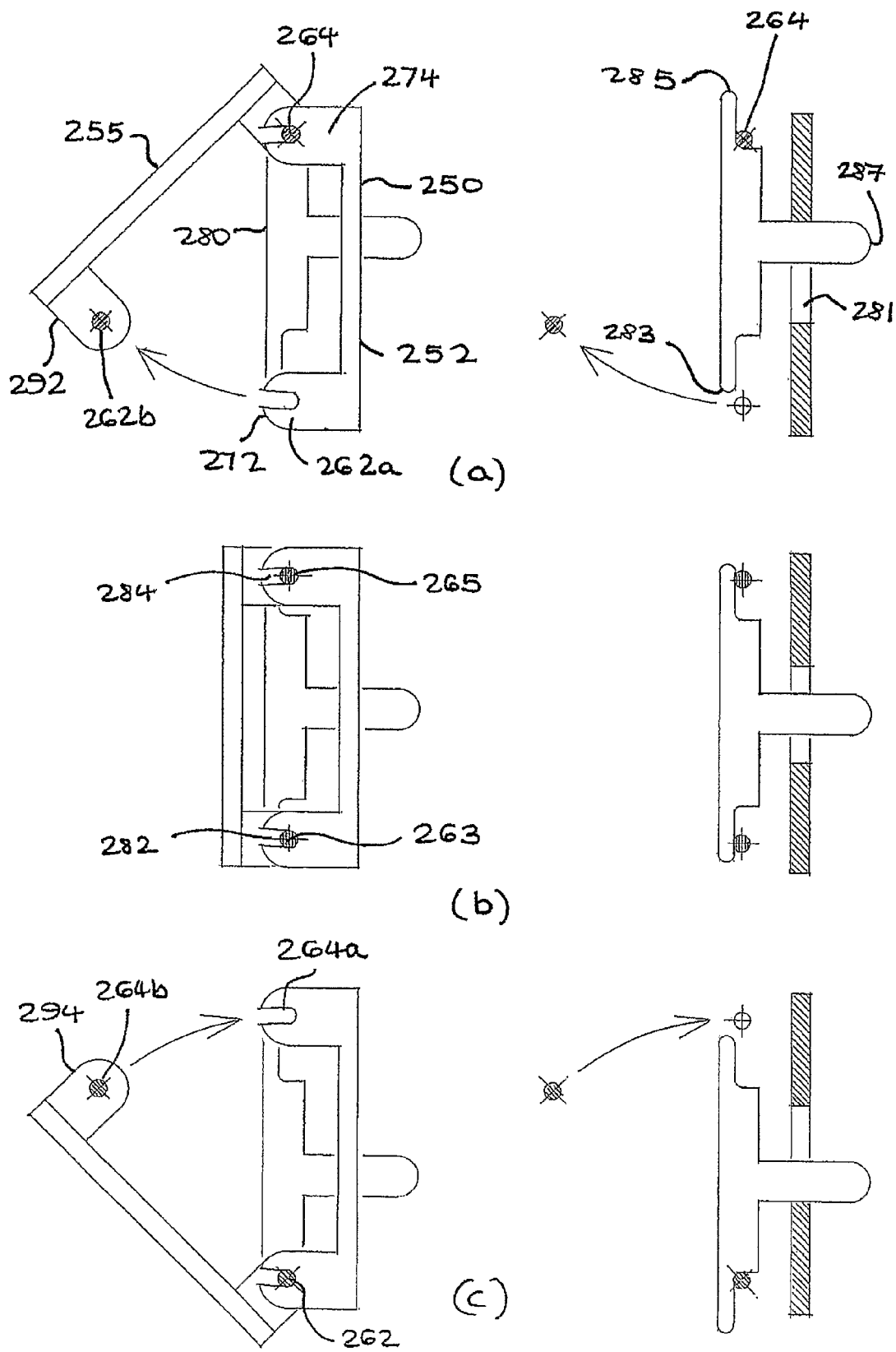
Figure 7:
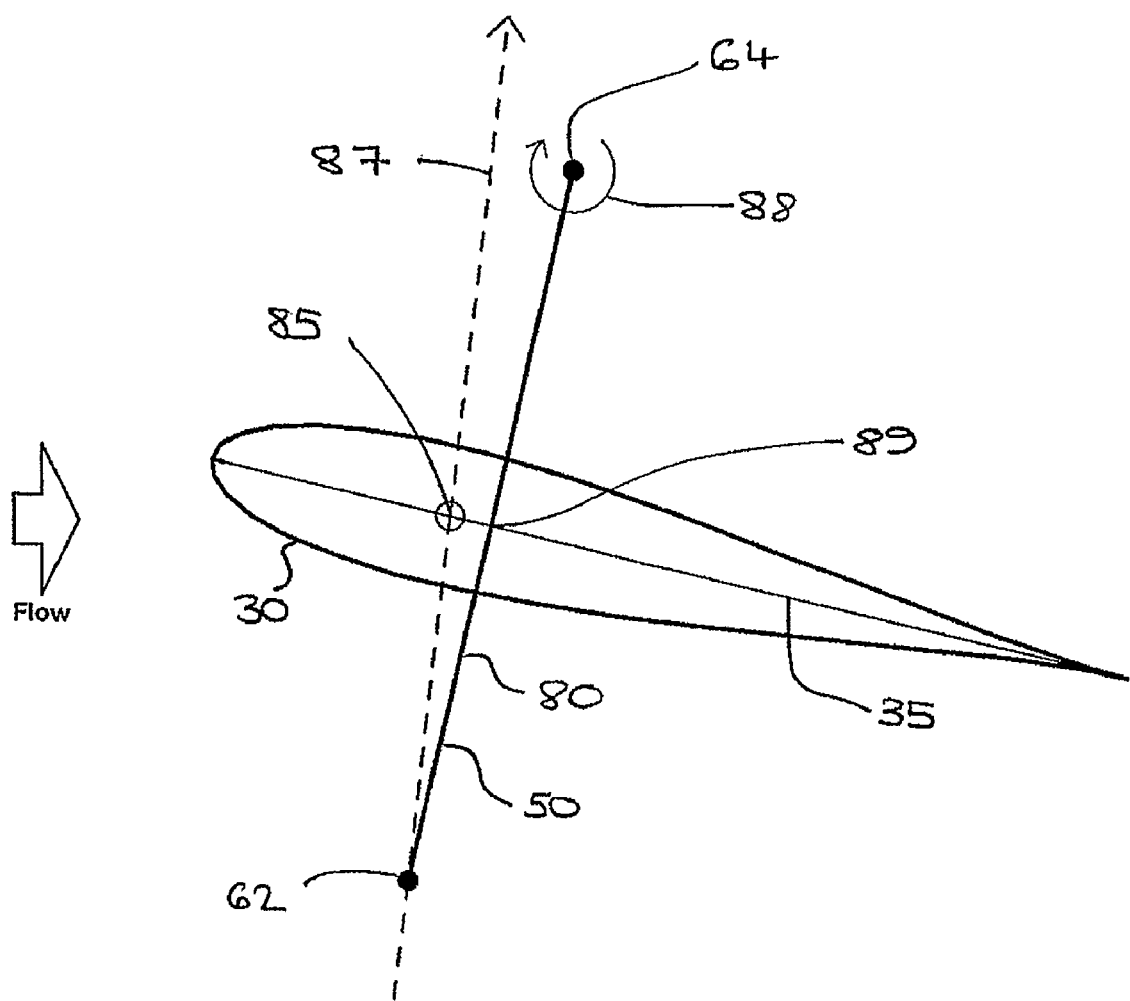
Figure 8:
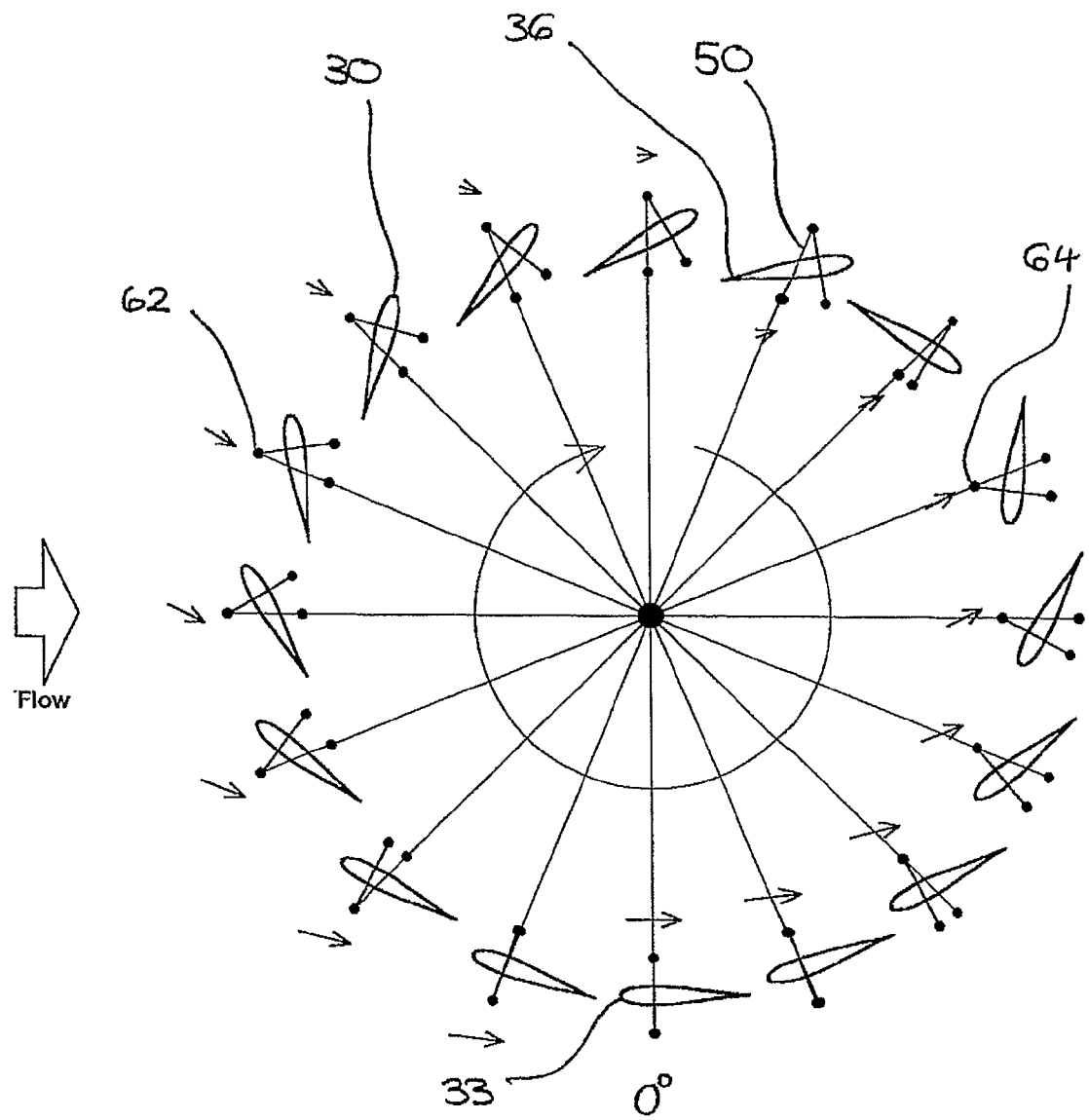
Figure 9:
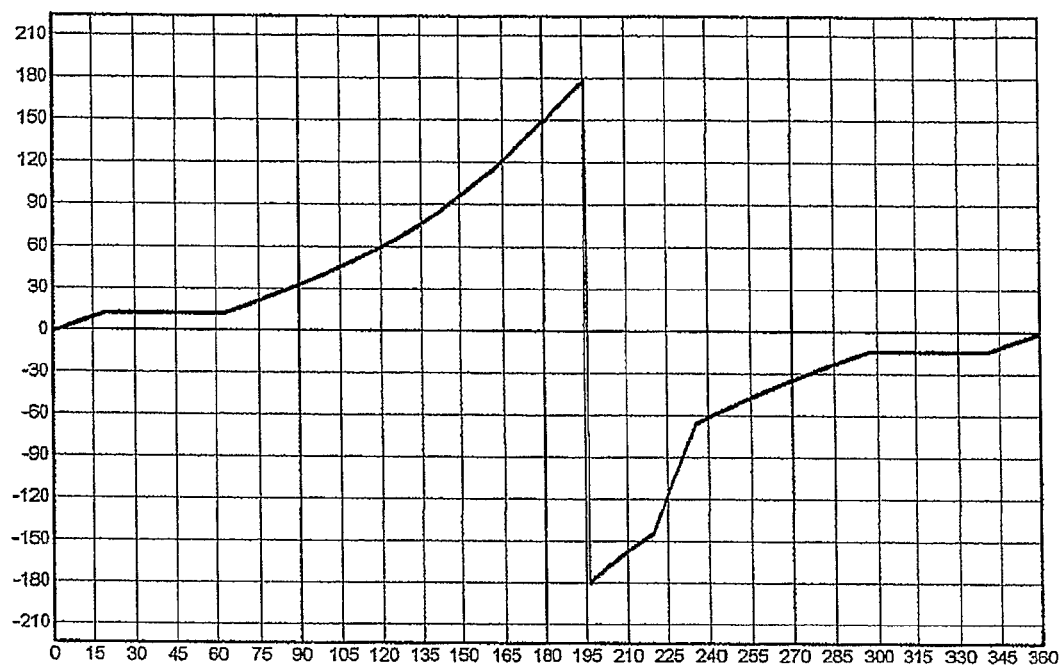
Figure 10:
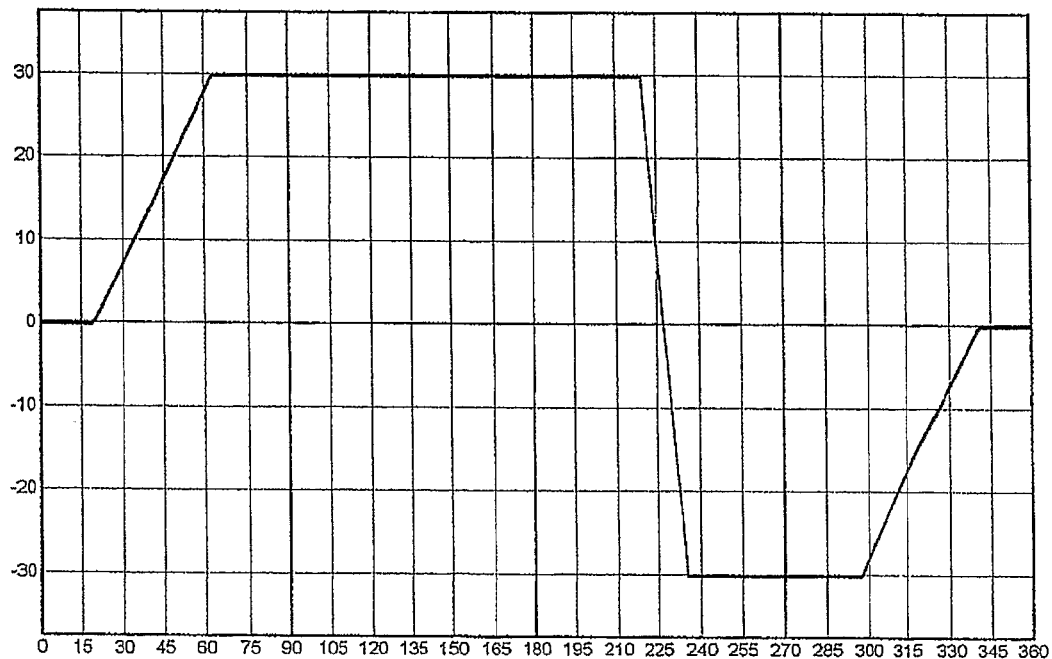
Figure 11:
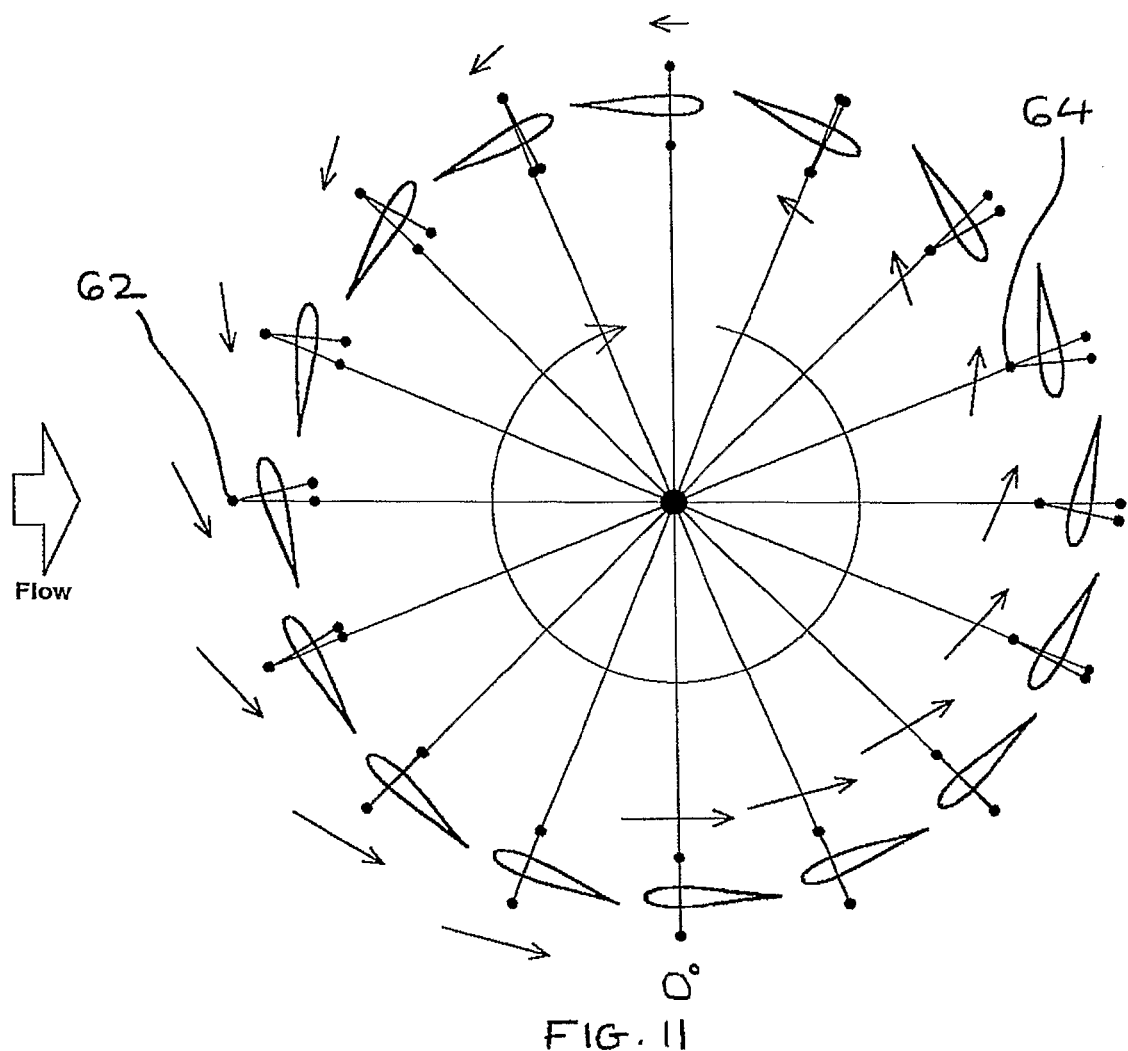
Figure 12:
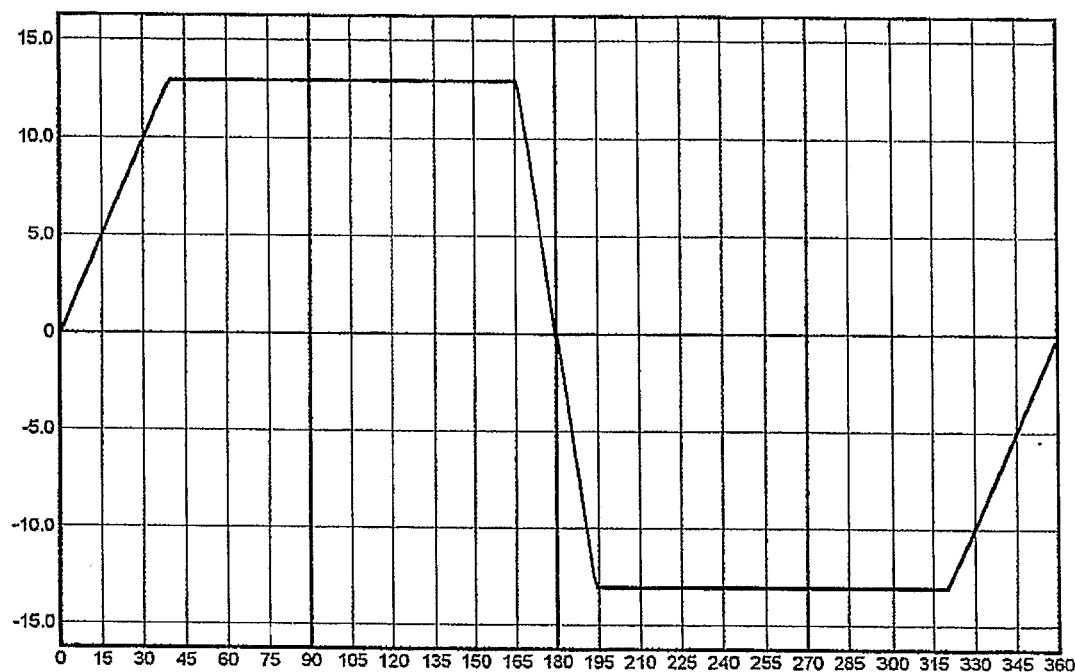
Figure 13:
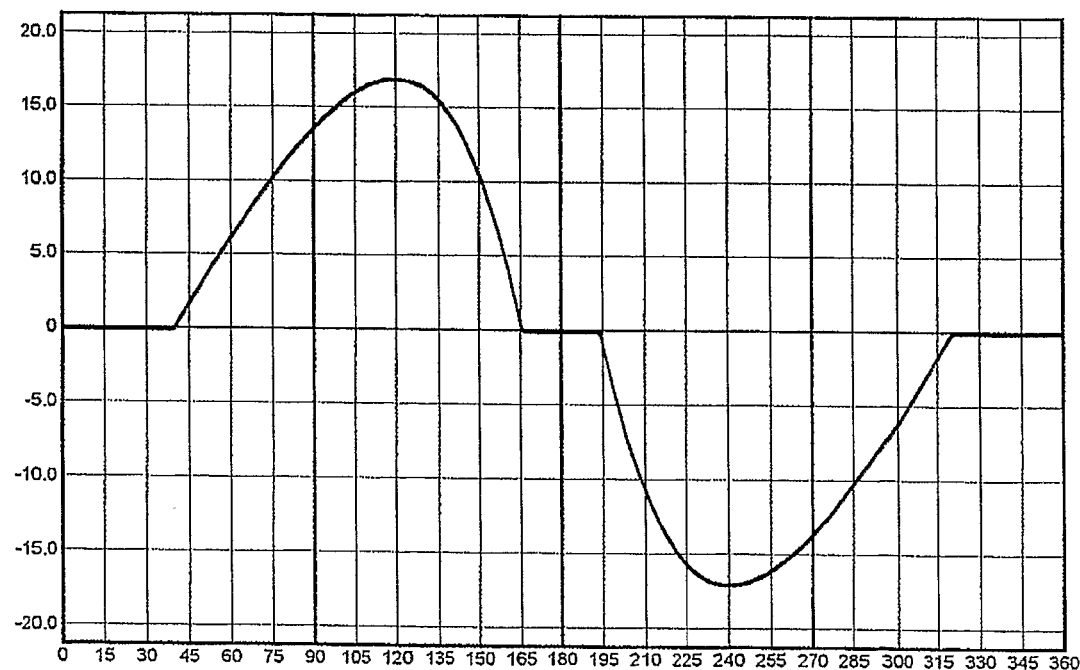
Figure 14:
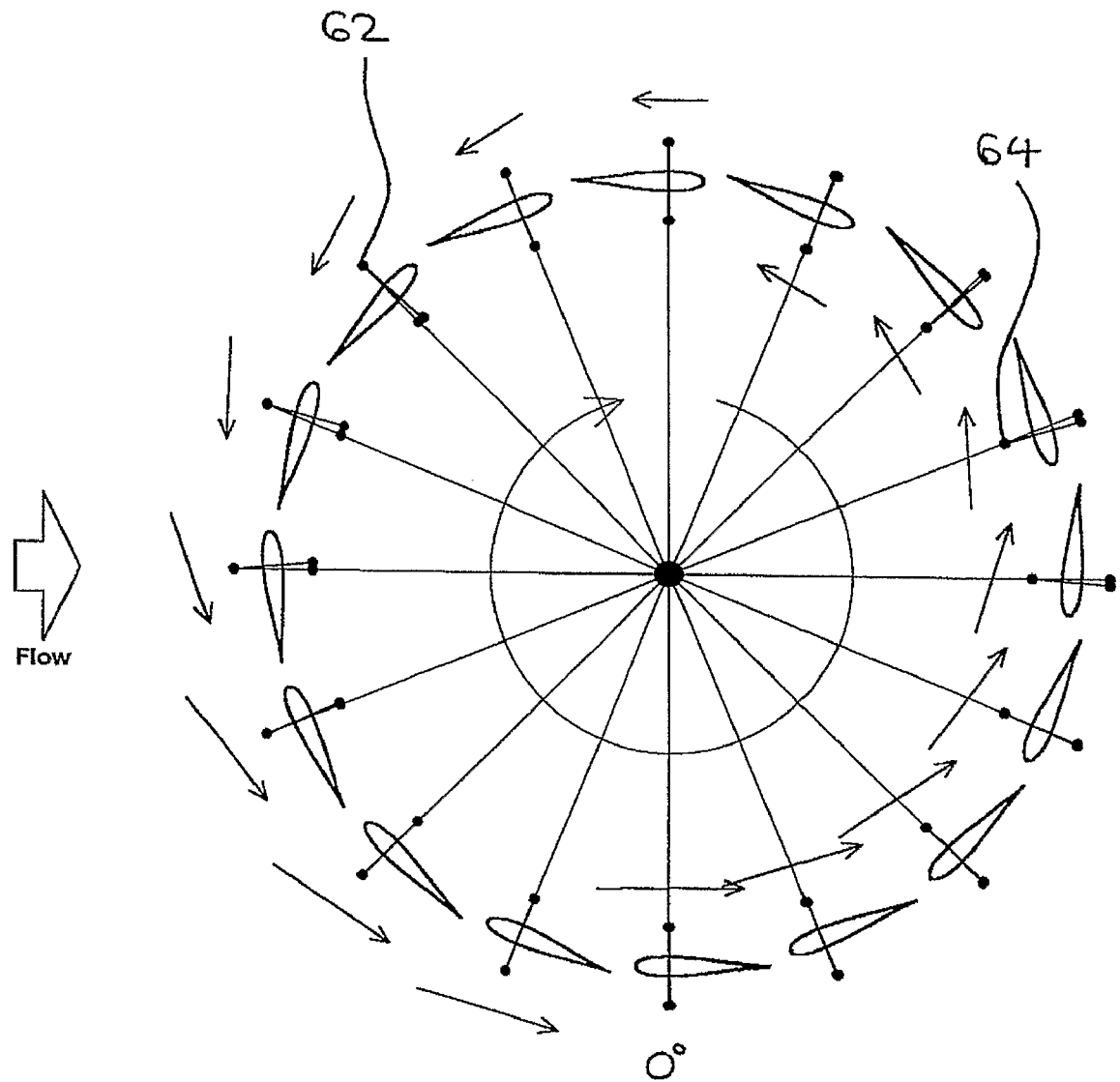
Figure 15:
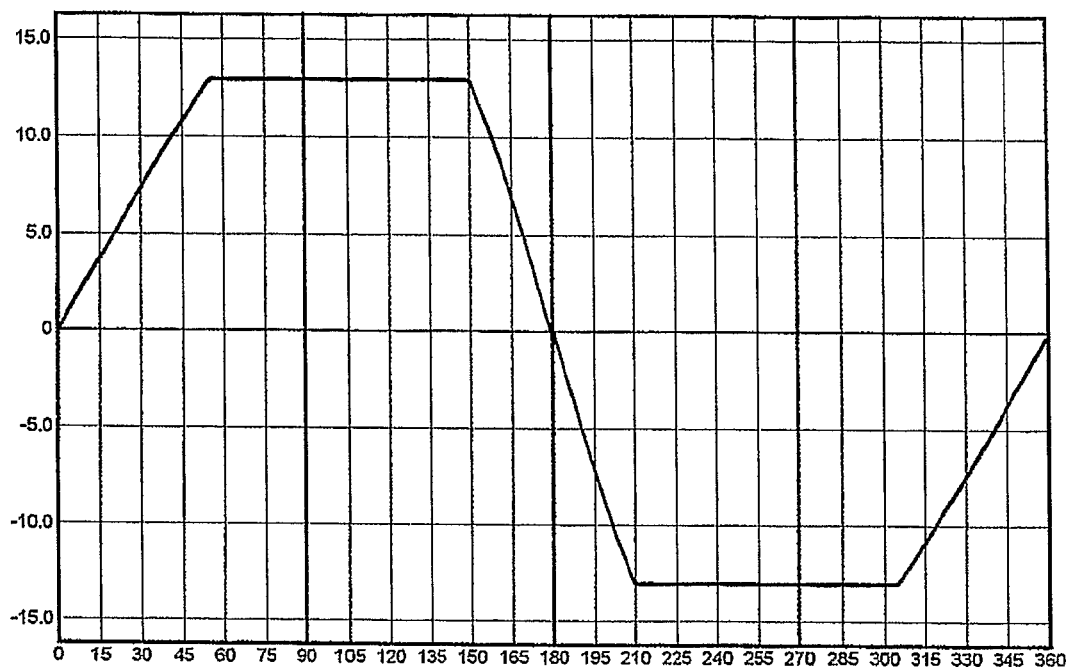
Figure 16:
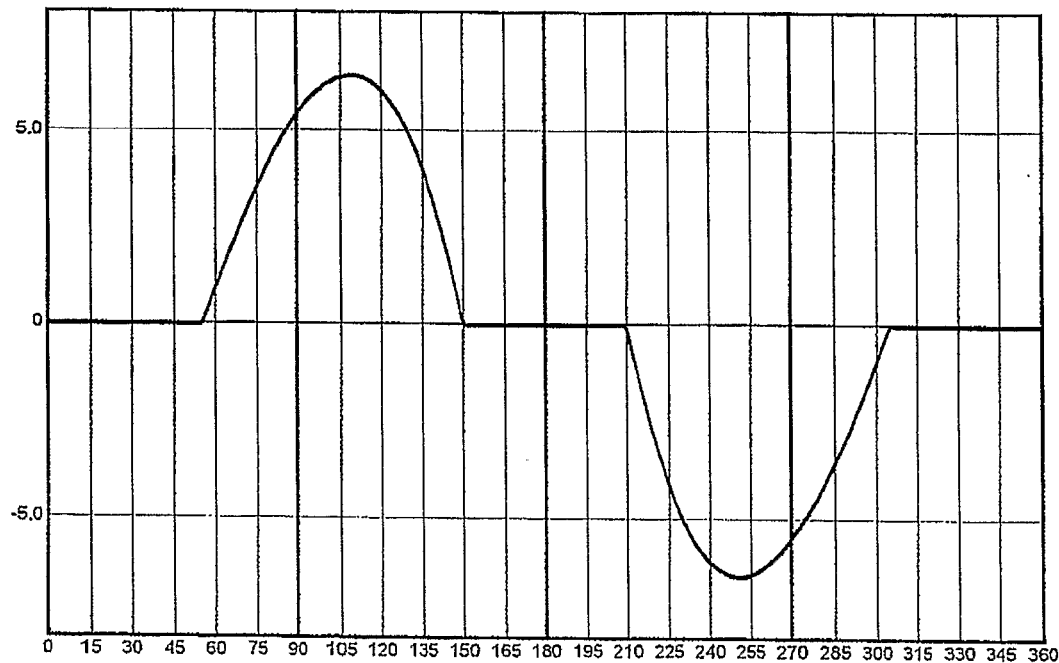
Figure 17:
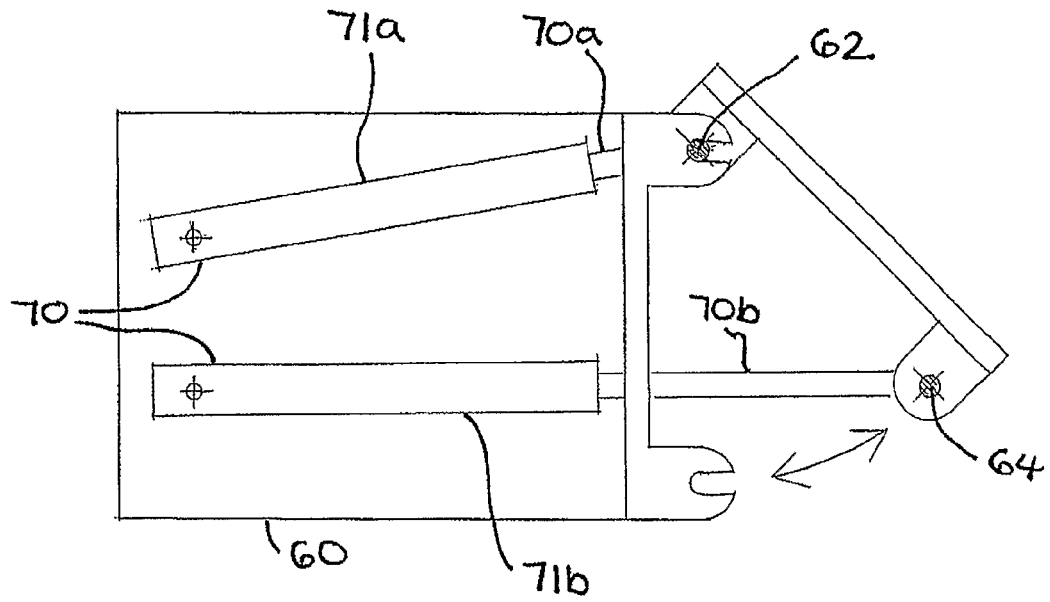
Figure 17:
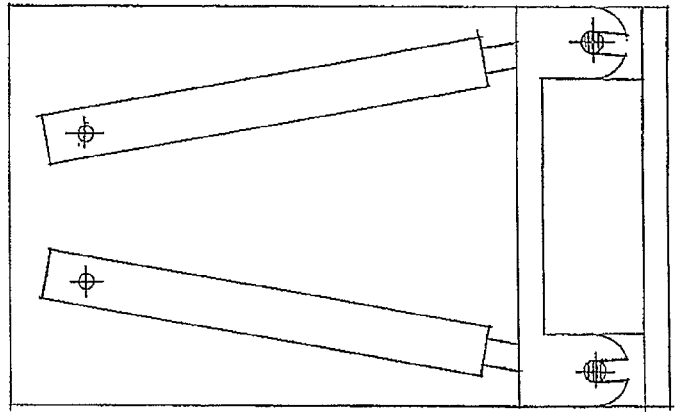
Figure 17:
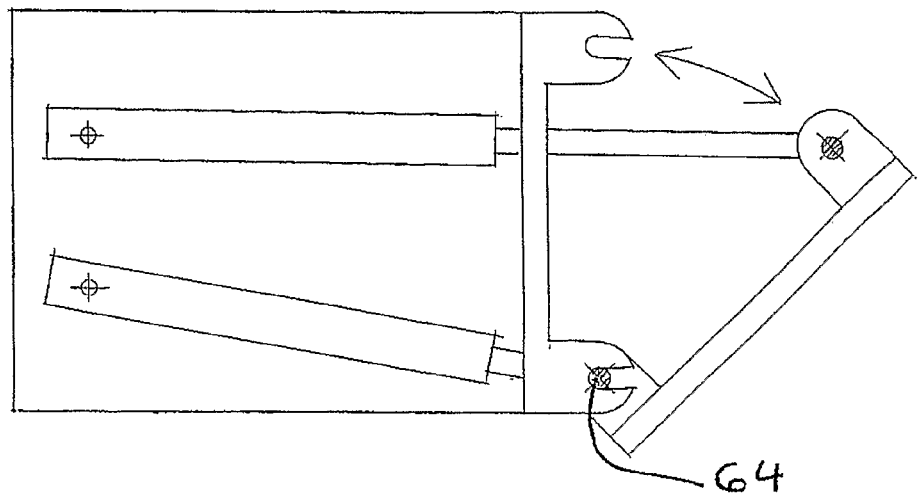
Figure 18:
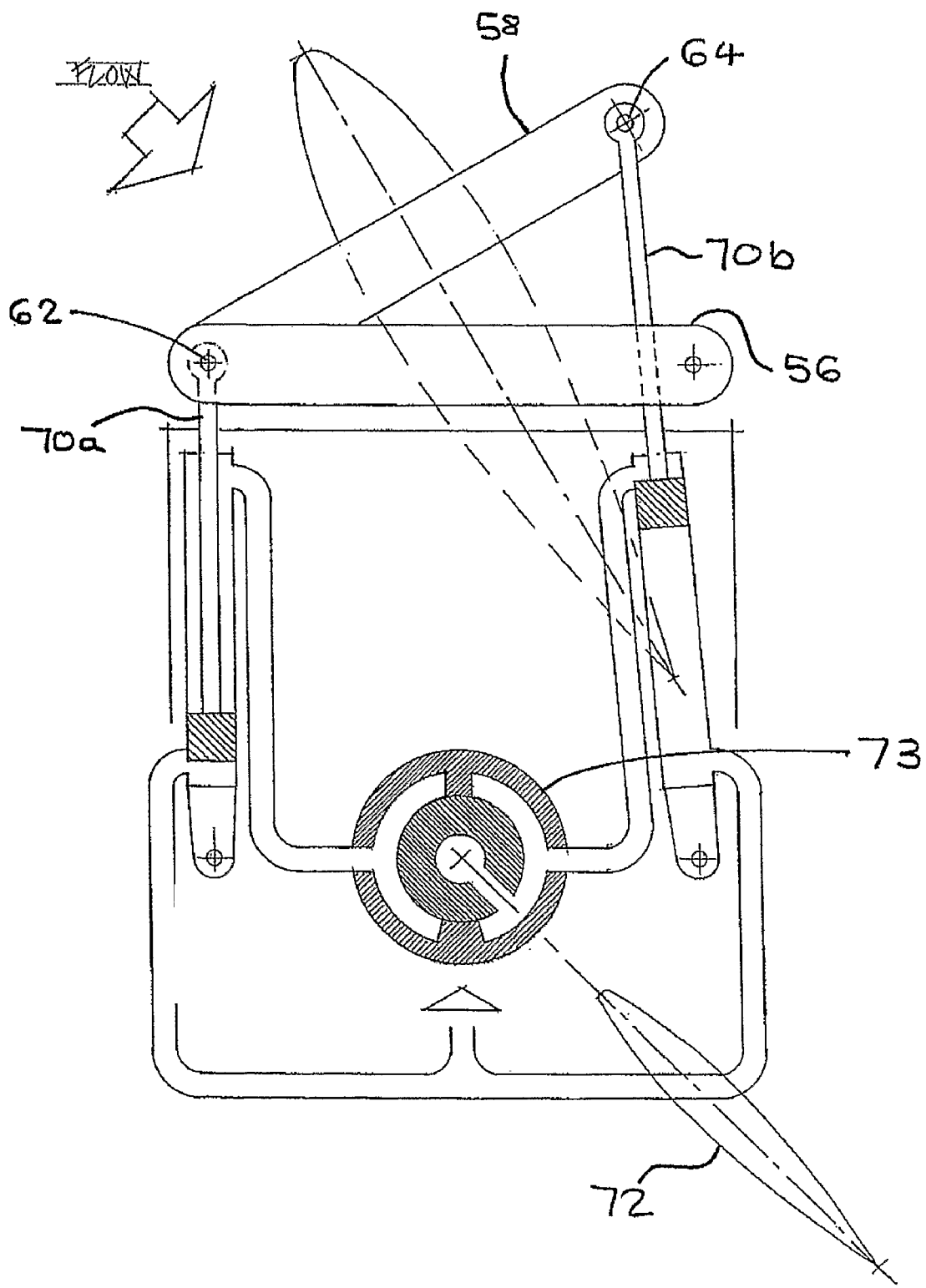
Figure 19A:
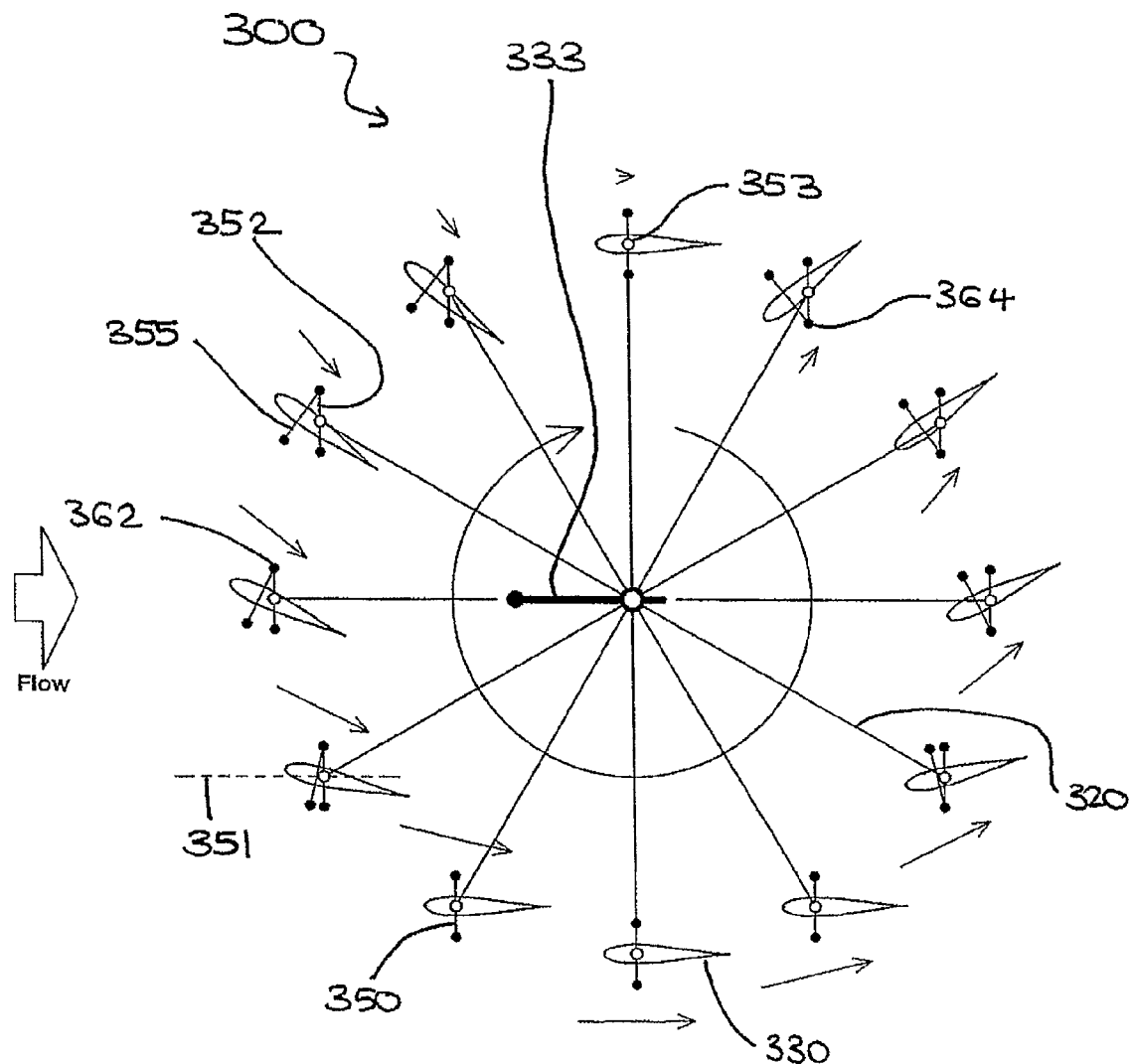

FIG. 4(*a*)-(*f*) show schematic views of a plural axis hinge with rigid links;

FIG. 5(*a*)-(*f*) show schematic views of a plural axis hinge with flexible links;

FIG. 6 (*a*)-(*c*) shows schematic views of a plural axis hinge having a sliding latch mechanism;

FIG. 7 is a schematic of a tacking foil mounted on a plural axis hinge such that the foil is balanced about the windward pivot by the resultant of the lift force and the drag force;

FIG. 8 is a schematic plan view of a vertical axis rotary crossflow power generator airfoil and hinge through a single revolution thereof at a tip speed ratio of 0.5;

FIG. 9 shows a plot of the airfoil AOA throughout the revolution of FIG. 8;

FIG. 10 is a plot showing the pitch angle of the airfoil throughout the revolution of FIG. 8;

FIG. 11 is a schematic plan view of a vertical axis rotary crossflow power generator airfoil and hinge through a single revolution thereof at a tip speed ratio of 2.0;

FIG. 12 shows a plot of the airfoil AOA throughout the revolution of FIG. 11;

FIG. 13 is a plot showing the pitch angle of the airfoil throughout the revolution of FIG. 11;

FIG. 14 is a schematic plan view of a vertical axis rotary crossflow power generator airfoil and hinge through a single revolution thereof at a tip speed ratio of 3.0;

FIG. 15 shows a plot of the airfoil AOA throughout the revolution of FIG. 14;

FIG. 16 is a plot showing the pitch angle of the airfoil throughout the revolution of FIG. 14;

FIG. 17 shows schematic views of a plural axis hinge without cross-links, but having hydraulic dampers;

FIG. 18 is a schematic representation of an airfoil and plural axis hinge with cross-links mounted on an airfoil, including hydraulic dampers controlled by a directional vane;

FIG. 19*a* is a schematic plan view of an airfoil and hinge of a vertical axis rotary crossflow propeller through a single revolution thereof at a tip speed ratio of 0.8

Figure 19B:
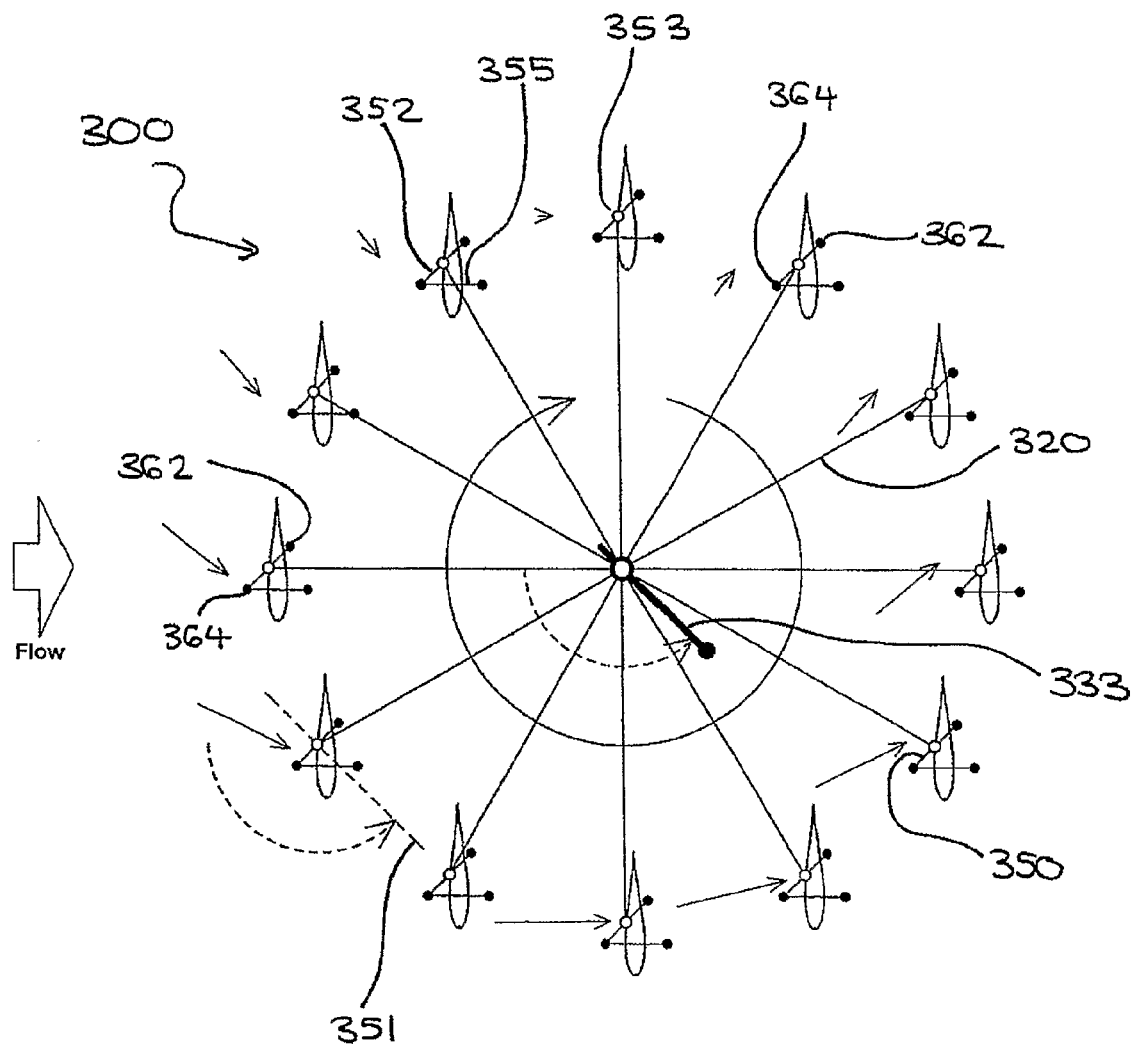

FIG. 19*b* is a schematic plan view of an airfoil and hinge of a vertical axis rotary crossflow propeller through a single revolution thereof in reverse thrust at a tip speed ratio of 0.8

Figure 20:
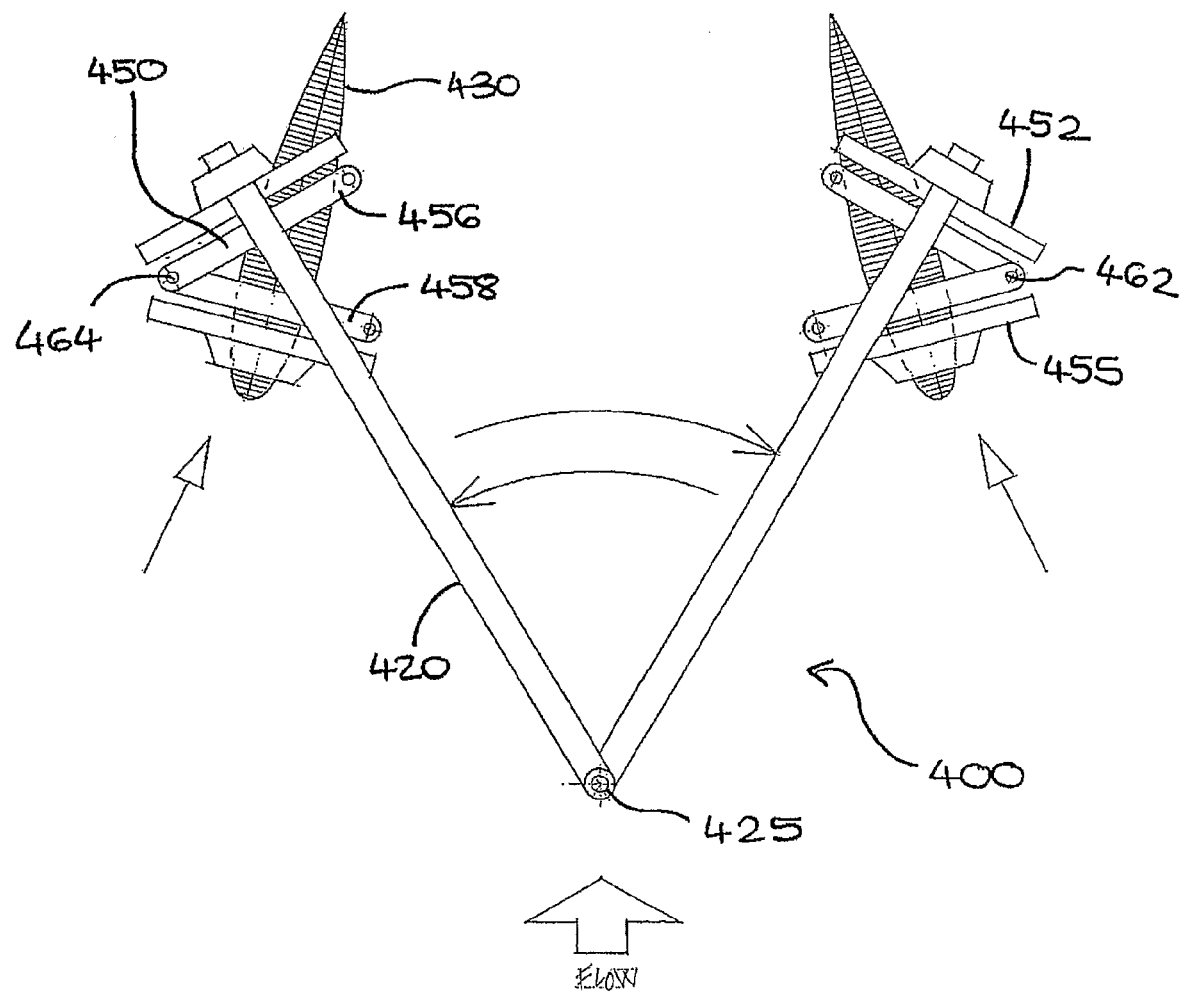
Figure 21:
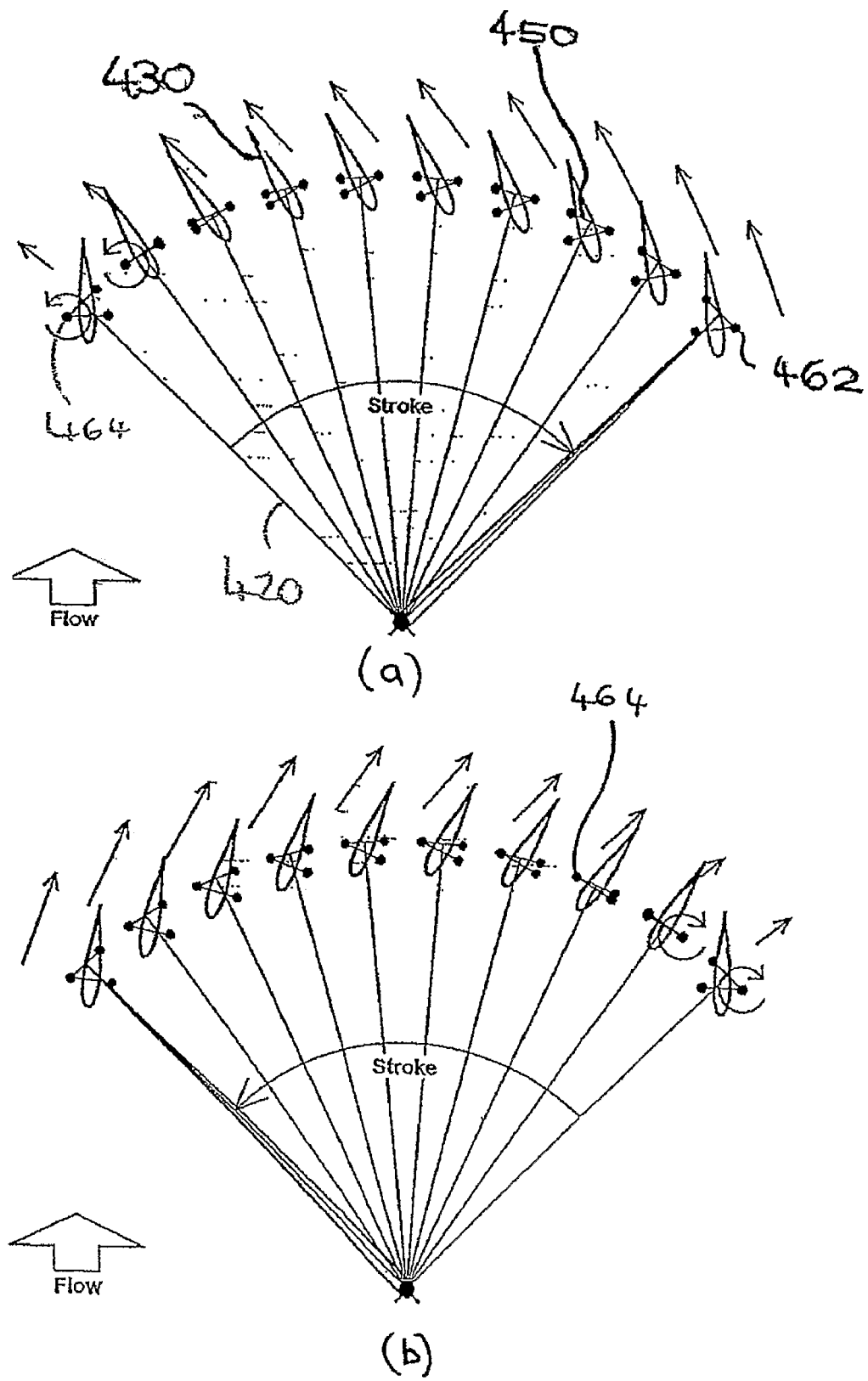
Figure 22:
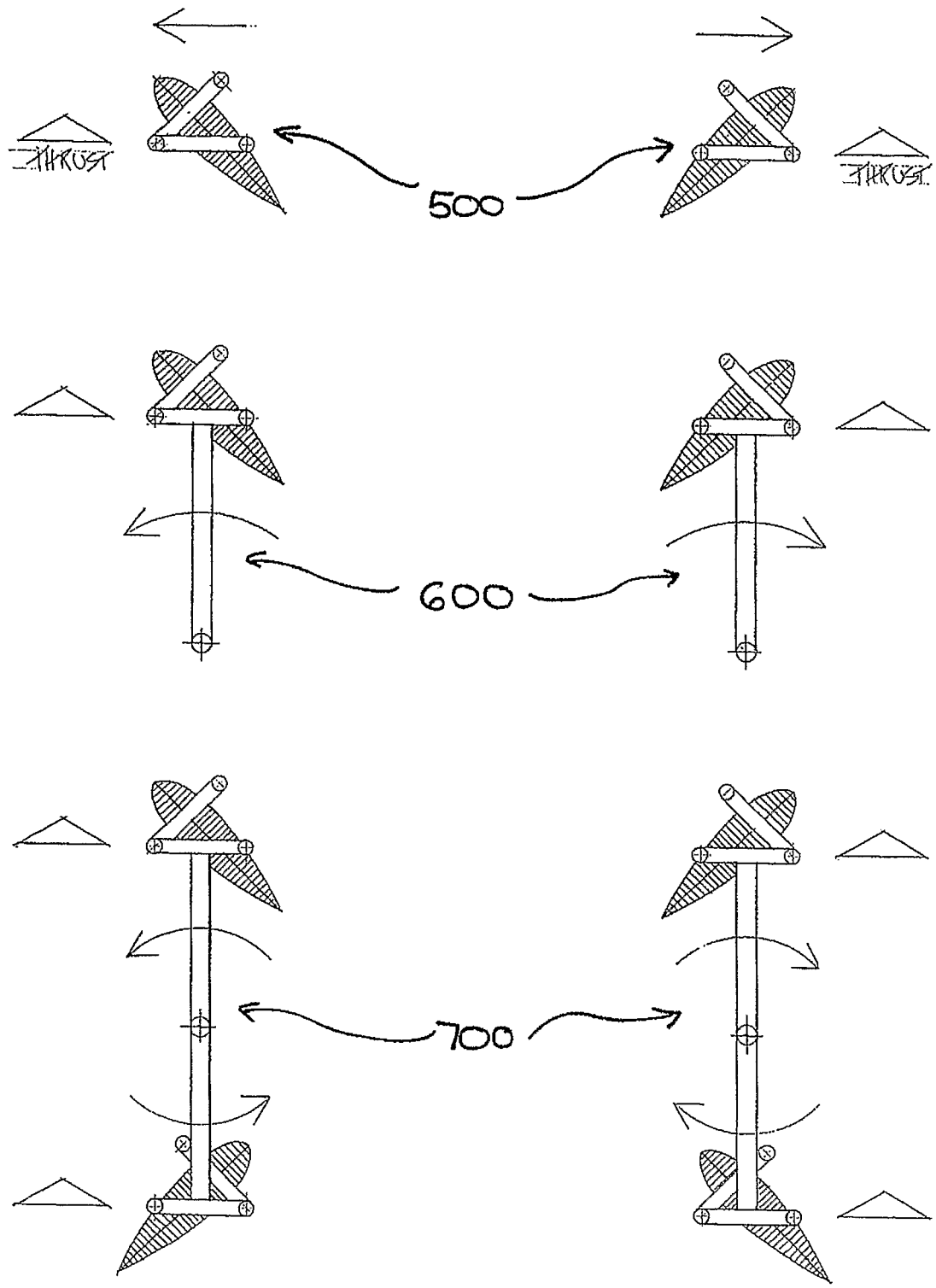
Figure 23:
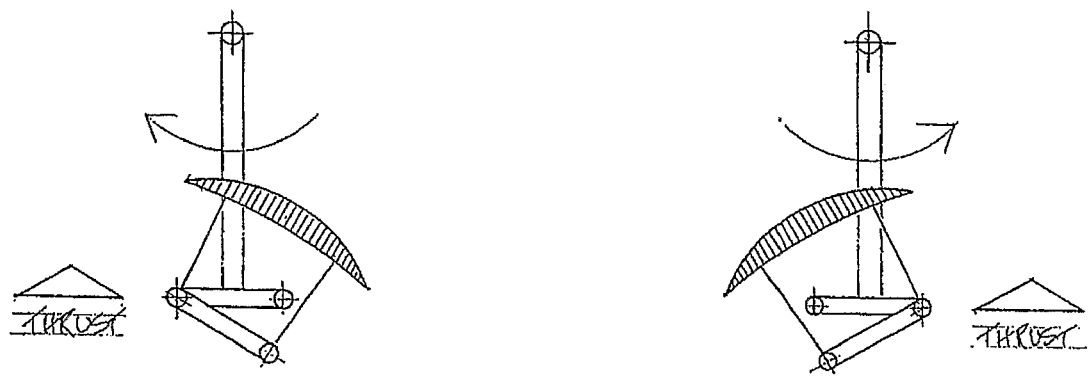
Figure 23:
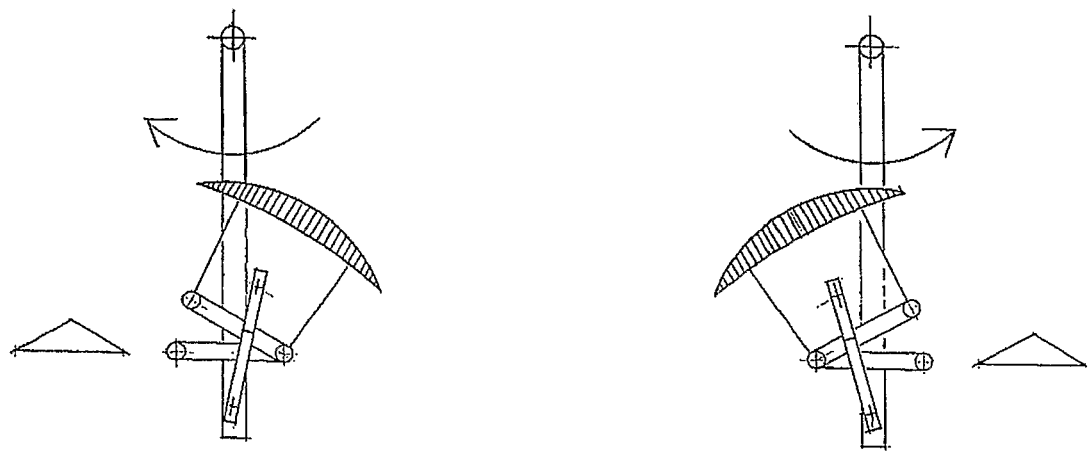
Figure 24:
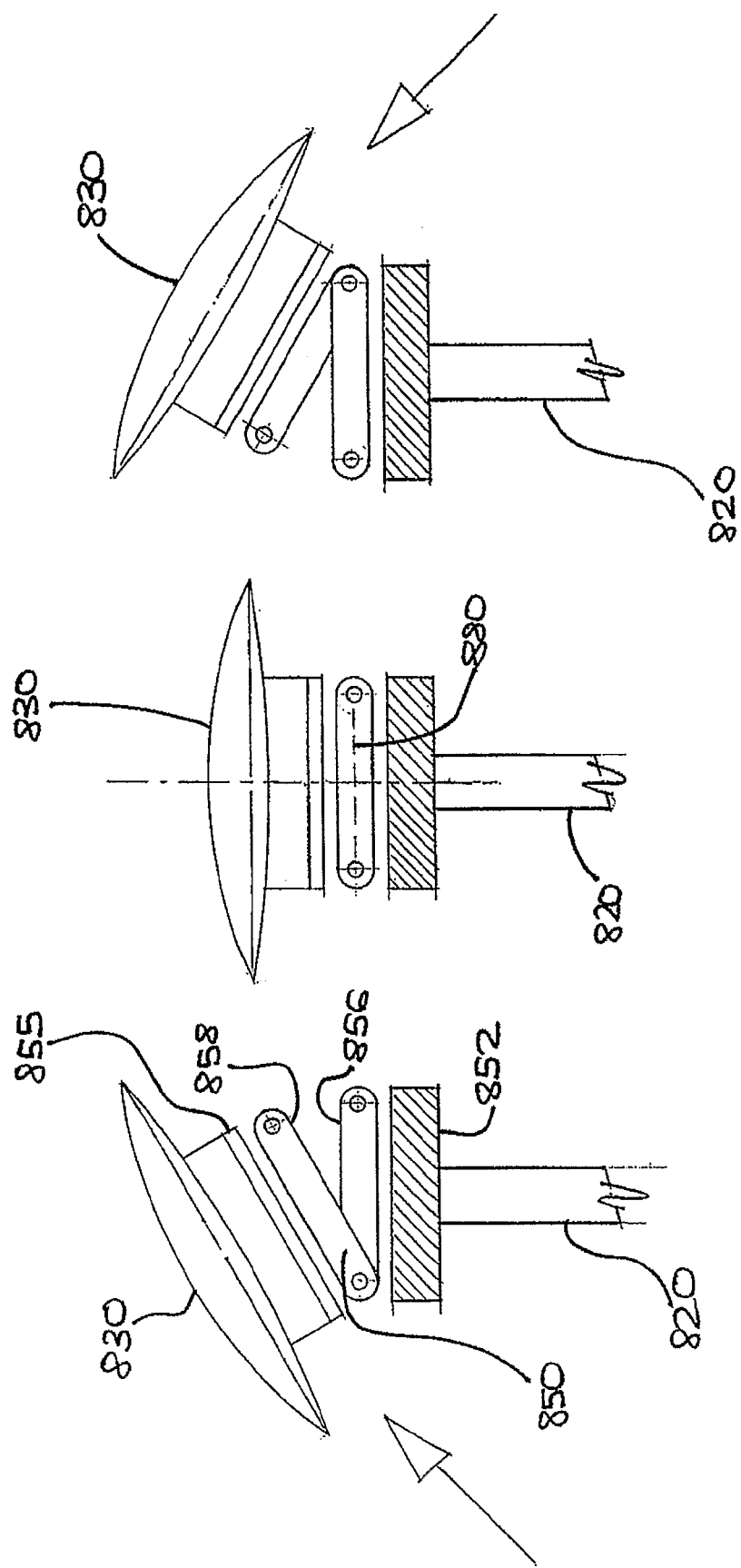
Figure 25:
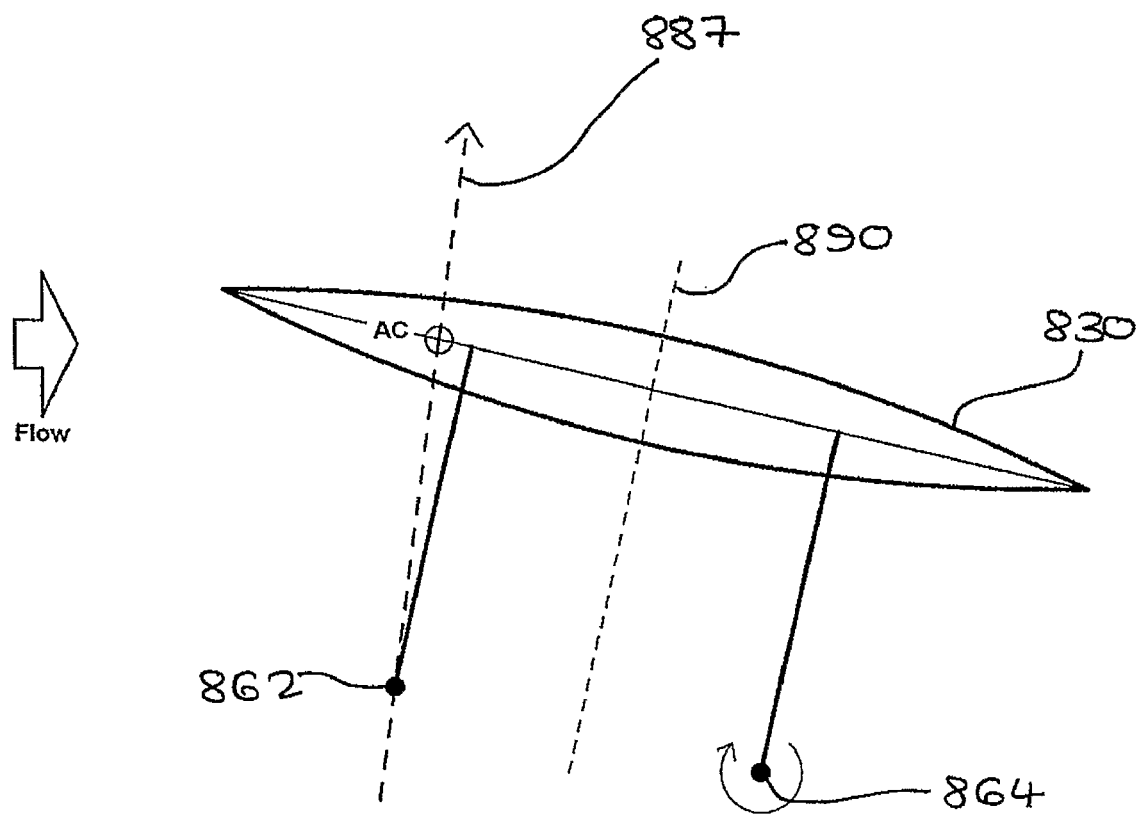
Figure 26:
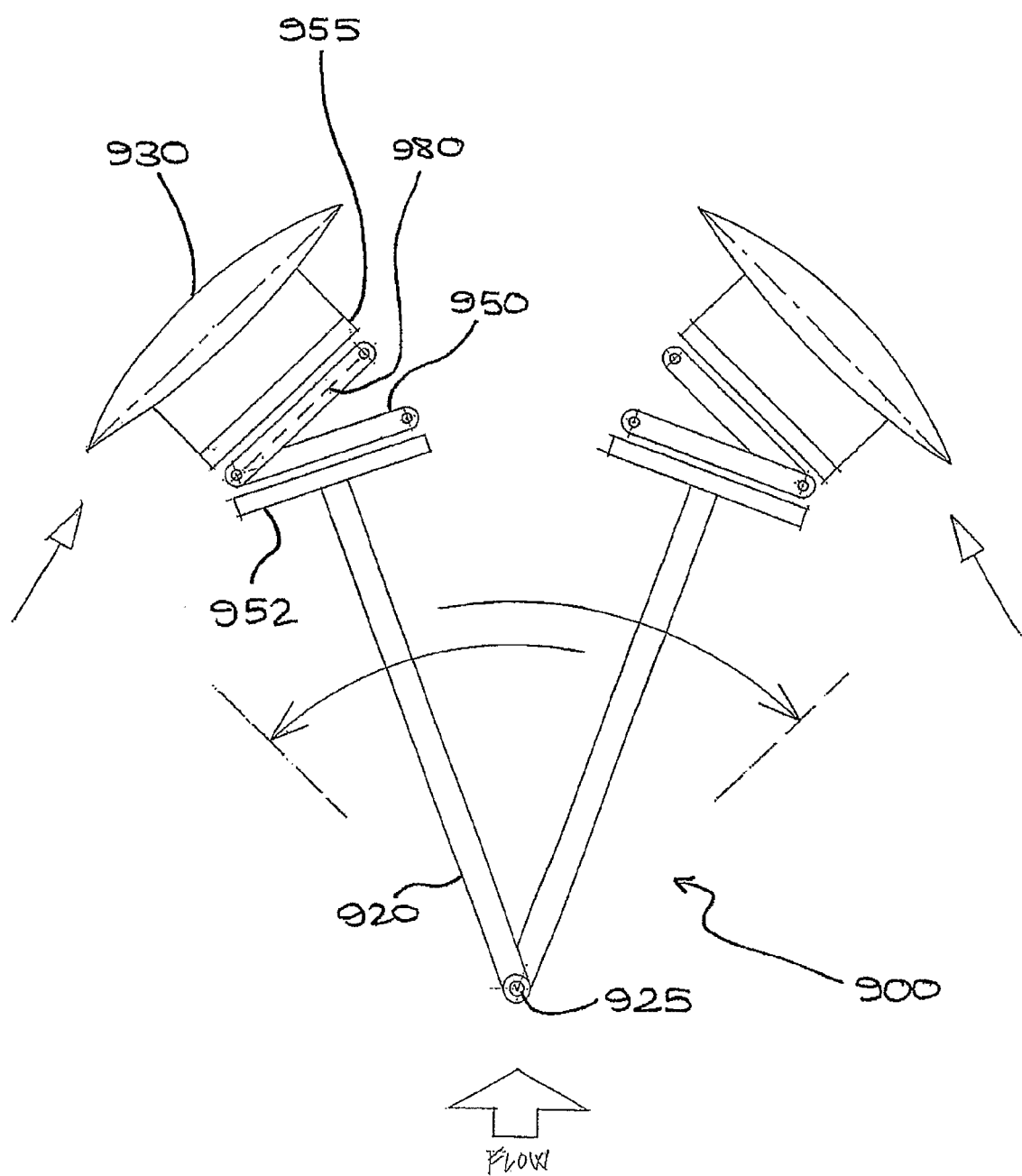
Figure 27:
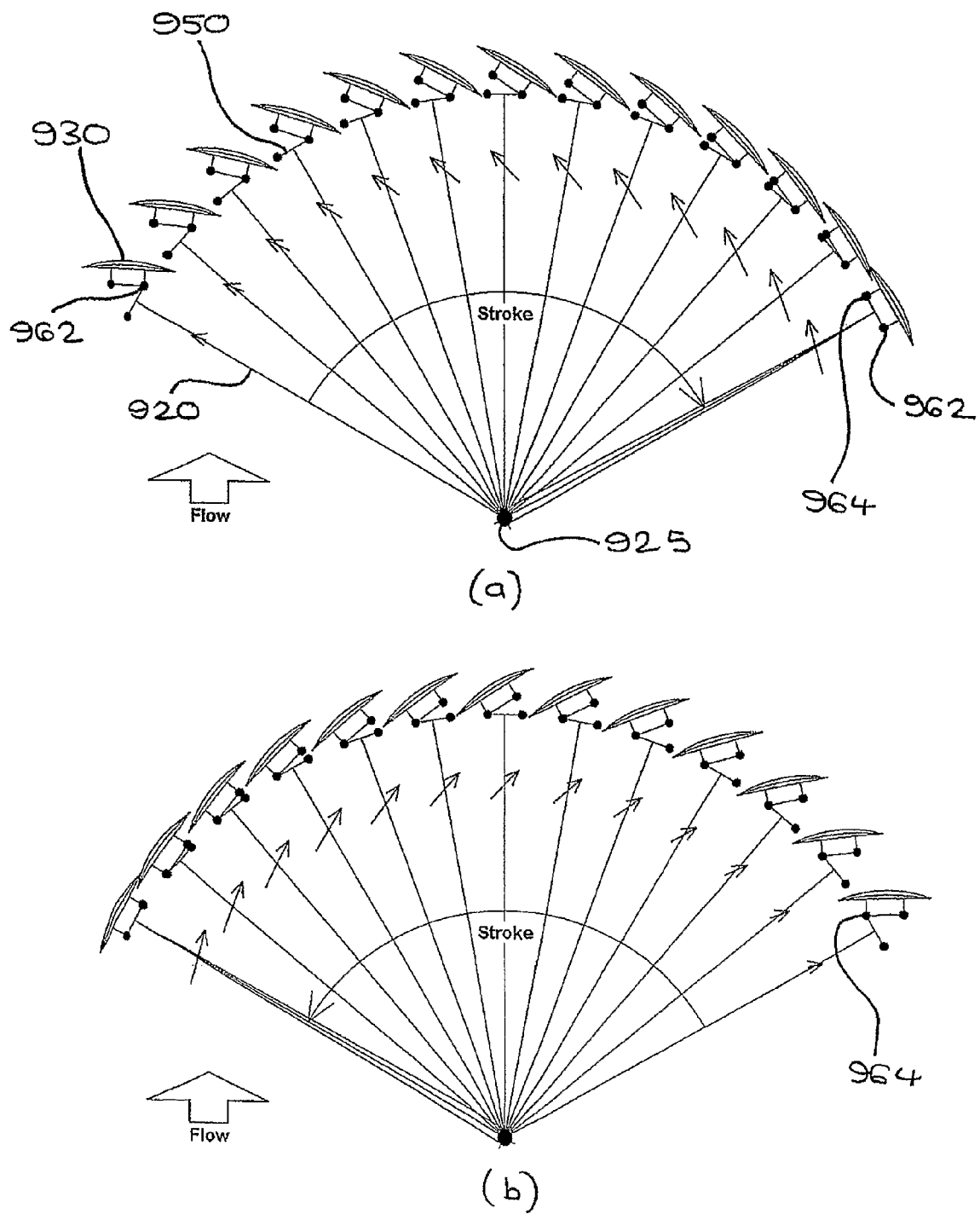
Figure 28:
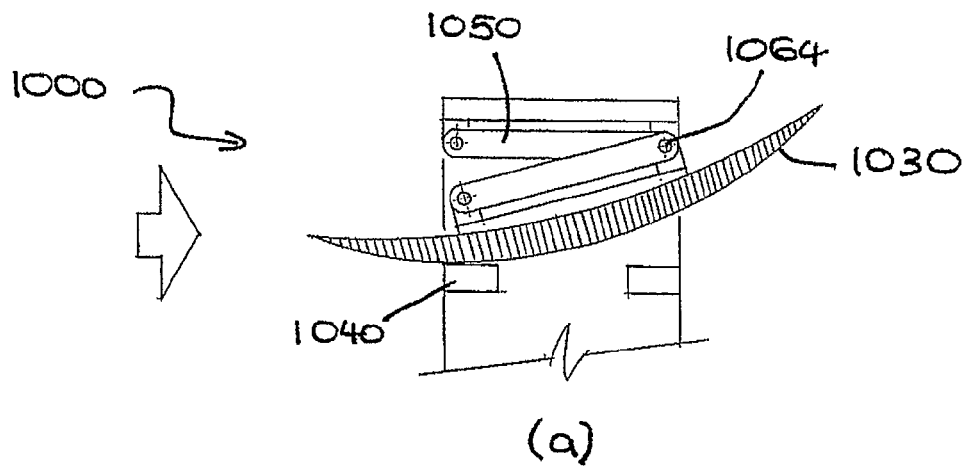
Figure 28:
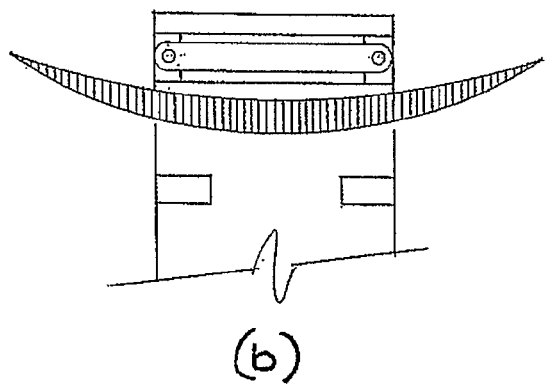
Figure 28:
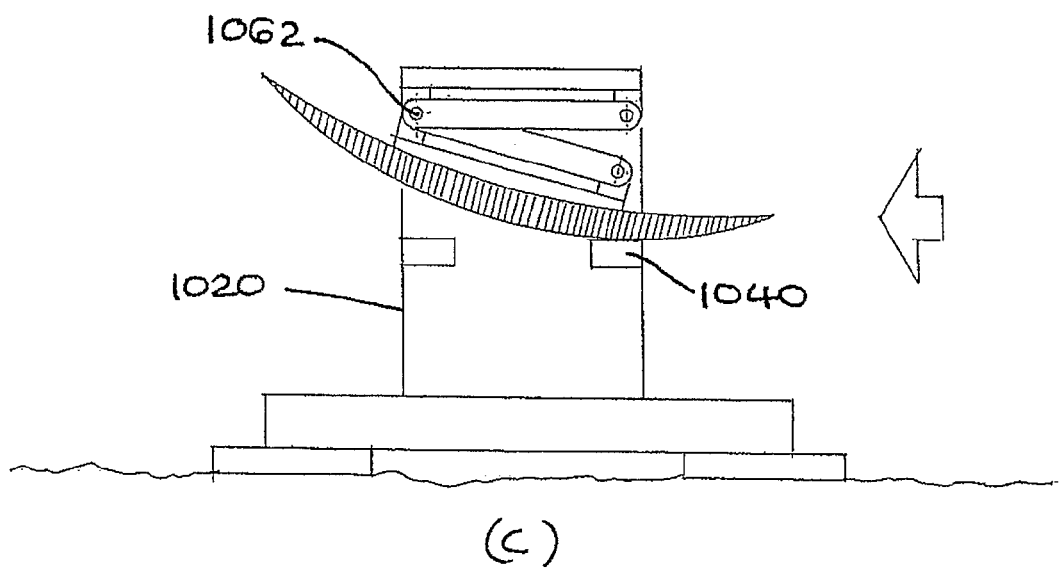
Figure 29:
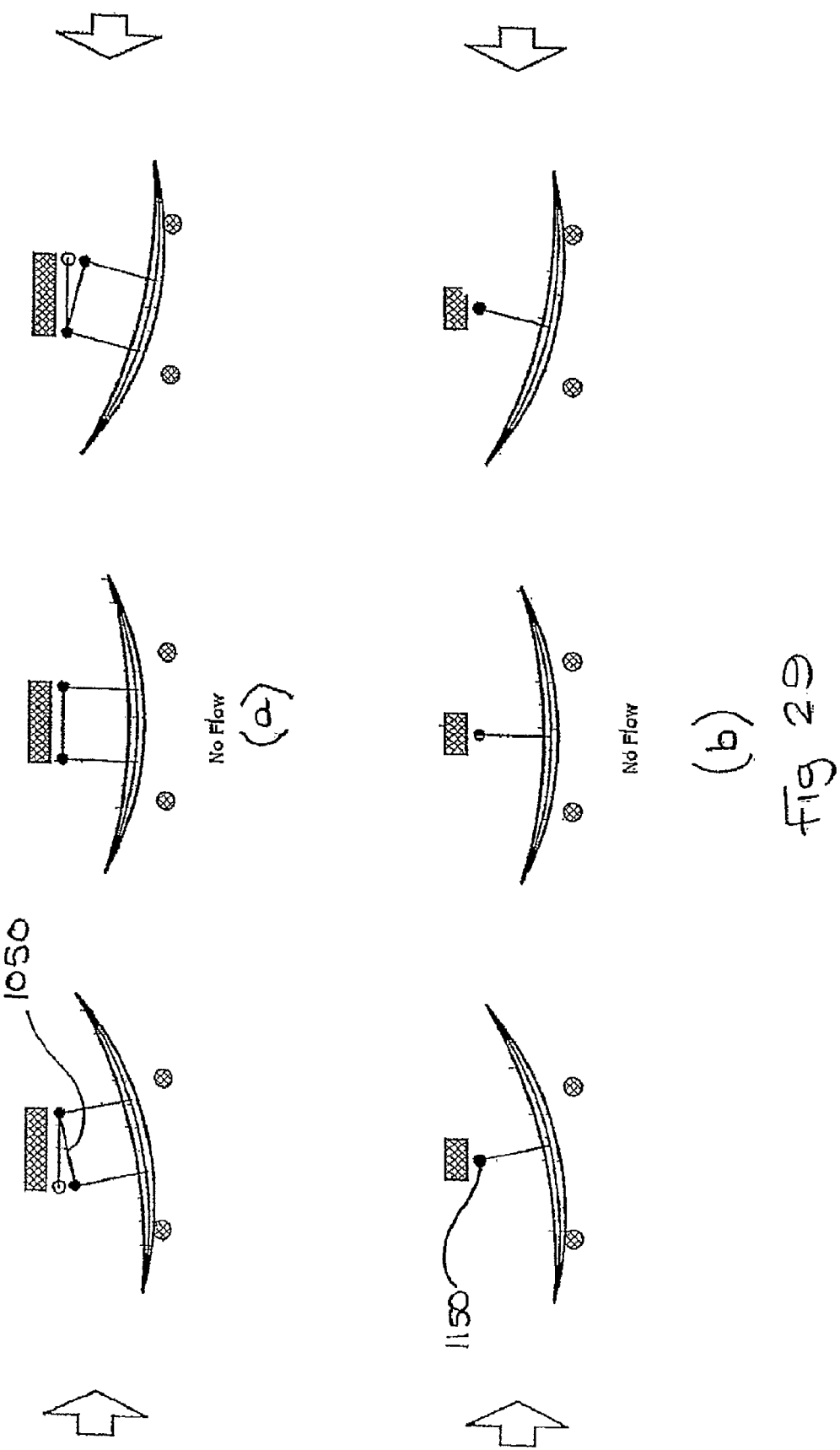
Figure 30:
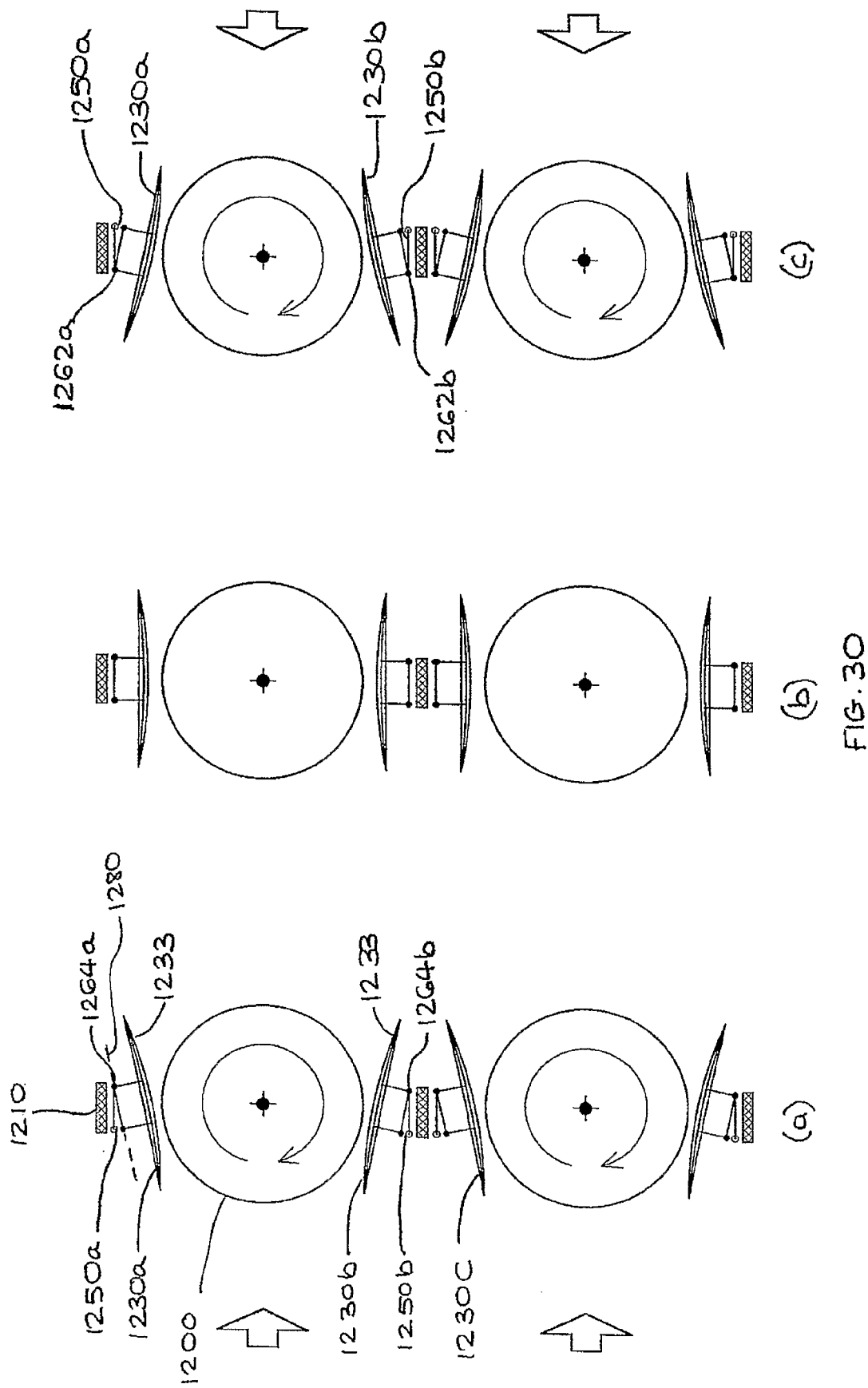

FIG. 20 is a schematic representation of an oscillating propulsor with a tacking airfoil and a plural axis hinge according to the invention;

FIG. 21 is a schematic view of a stroke cycle of the oscillating propulsor of FIG. 20;

FIG. 22 shows schematic representations of a plural axis hinge mounted to various oscillating propulsor devices;

FIG. 23(*a*) is a schematic representation of an oscillating propulsor having a shunting foil and a plural axis hinge for pitch control;

FIG. 23(*b*) is a schematic representation of an oscillating propulsor having a shunting foil and a plural axis hinge for end of stroke turning;

FIG. 24 shows schematic views of a shunting foil and plural axis hinge;

FIG. 25 is a schematic of a shunting foil balanced on a plural axis hinge;

FIG. 26 is a schematic view of an oscillating power generator in accordance with the invention;

FIG. 27 is a schematic view through a stroke cycle of an oscillating power generator in accordance with the invention;

FIG. 28 is a schematic representation of a force generation device in accordance with the invention;

FIG. 29*a* shows schematic representations of a force generation device or a flow control device including a plural axis hinge;

FIG. 29*b* shows schematic representations of a force generation device or a flow control device including a single axis hinge; and FIG. 30 (*a*)-(*c*) shows schematic plan views of a vertical axis rotary crossflow power generator tidal array including a flow control device in accordance with the invention.

Figure 1:
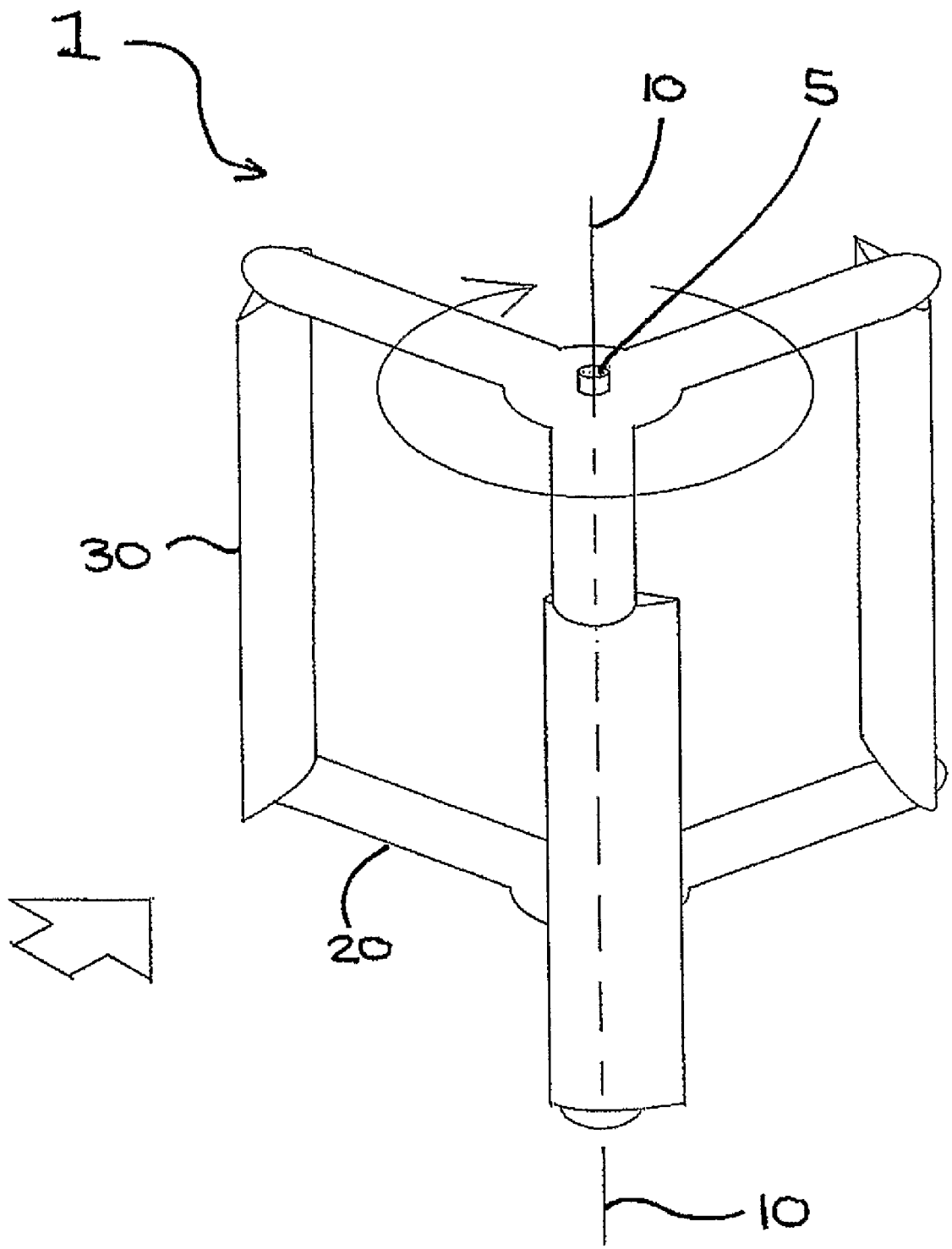
FIG. 1 is a schematic perspective of a rotary crossflow power generator according to an aspect of the invention.

In an embodiment of the invention, FIG. 1 shows a rotary crossflow power generator 1 suitable for use in a free flowing fluid such as tidal flow. The generator 1 comprises a shaft 5 having a rotation axis 10 about which the whole generator rotates during use thereof. A plurality of upper and lower support arms 20 radiate outwardly from the upper and lower ends of the shaft 5 at equi-spaced angles. A tacking foil 30 extends between each set of upper and lower support arms, spaced from the shaft such that a longitudinal axis of the foils is aligned in parallel with the rotational axis 10. Whilst the embodiment shown has three foils 30, in practice there can be any desired number of foils 30 and support arms (upper and lower, or mid-span) as may be appropriate according to specific power requirements and specific device design. The rotary shaft power of the rotary crossflow power generator may be transferred via a power transmission device (not shown) or gearbox (not shown) to an electrical generator (not shown) to produce electrical power as is well known in the art. Alternatively, the rotary shaft power of the rotary crossflow power generator may be transferred directly to an electrical generator designed for low speed operation.

During operation of the rotary crossflow power generator, the AOA of the foils is maintained close to an optimum AOA so that the foils may generate the maximum lift force and power without incurring the penalties of excess drag. The optimum AOA of a foil may at various points during a revolution be at a maximum design AOA or it may be at a lesser AOA. This depends on the striking angle of the apparent flow direction with respect to the tangent to the arc of rotation of the foil. When the striking angle is greater than the design AOA, the optimum AOA is the design AOA. When the striking angle is less than the design AOA, the optimum AOA is the striking angle. The design AOA varies according to the foil design and/or type of device on which the foil is used, and is normally between 8 degrees and 15 degrees. In the present embodiment, the design AOA is about 13 degrees. As foil performance and generated power can degrade quickly with even small variations of a few degrees either side of the optimum AOA, it is important to maintain the foils' AOA as closely as possible to the optimum AOA at all times.

Figure 2:
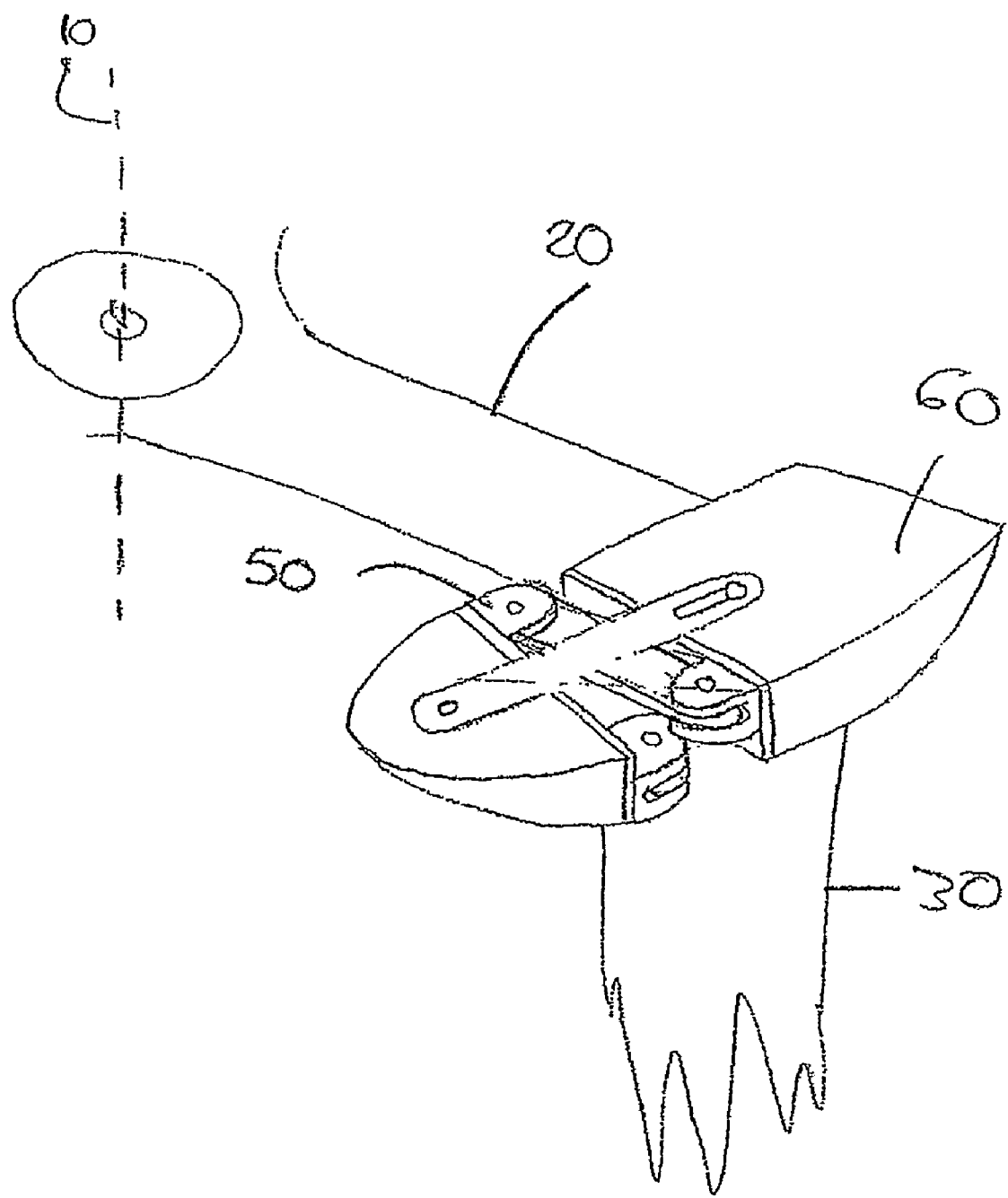
FIG. 2 is a schematic perspective view of a rotor arm of the rotary crossflow power generator showing a plural axis hinge.

As shown in FIG. 2, the pitch of the foils 30 is controlled using a plural axis hinge 50. The plural axis hinge 50 is mounted rigidly to a fairing 60 such that a transverse axis of the hinge remains closely or substantially tangential to the arc of rotation of the foil during use of the device. The transverse axis of the plural axis hinge may be defined as a virtual line passing through the mid-point of, and perpendicular to the pivot centreline of the hinge. The precise alignment of the transverse axis of the hinge depends on the specific characteristics of the hinge, foil and generator employed, and is usually found to be within 5 degrees of the tangent to the arc of the rotation, although this may be greater, particularly if a large foil chord is used with a small generator diameter. The fairing 60 is connected to or integral with the support arm 20 at each end of the shaft 5. The hinge 50 and its co-operation with the foil 30 are shown schematically in FIGS. 3*a*-3*c*.

In each of FIGS. 3*a*-3*c*, the foil is a tacking foil in which, under normal operational conditions of the device using the foil, the leading edge 33 always faces the flow direction shown by the arrows and the trailing edge 36 always faces away from the flow direction.

The hinge comprises a fixed plate 52 that is affixed to the fairing 60 and hence to the support arm 20 of the rotary device 1. The hinge further comprises a moving plate 55 which is affixed to the foil 30 and which opens and closes depending on the fluid dynamic forces acting upon the foil.

As seen in FIG. 3*a*, pivoting cross-links 56, 58 lie between the fixed plate 52 and the moving plate 55. The cross-links 56, 58 are elongated bars at either end of each is a pivot centre 62 and 64. The span between the pivot centres 62, 64 is determined by the need to minimise drag generation by the hinge on the one hand and the need to achieve balance of the foil on the other hand. The former requires a small hinge span whilst the balance stability of the foil improves as the span increases. Such an exercise is within the remit of the skilled person in the art according to specific requirements.

The hinge 50 responds to the apparent flow direction and fluid dynamic forces acting upon the foil 30. Thus in an apparent flow which alternates in direction either side of a transverse axis of the hinge 50, the hinge 50 may open about pivot centre 62 as shown in FIG. 3*a* or about pivot centre 64 as shown in FIG. 3*c*. When the apparent flow direction is closely in line with a transverse axis of the hinge, the hinge 50 remains in a closed position as shown in FIG. 3*b*, and the cross-links 56, 58 lie co-axially one above the other.

Turning now to FIG. 4, the sequence of movement of the hinge 50 can be seen more clearly. In the embodiment of FIG. 4, the cross-link members 56 and 58 are rigid members.

As seen in FIG. 4*b*, the cross-link member 56 connects pivot centre 62*a* of the fixed plate 52 together with pivot centre 64*b* of the moving plate 55. Similarly, cross-link member 58 connects pivot centre 64*a* of the fixed plate 52 together with pivot centre 62*b* of the moving plate 55. In this manner the hinge plates are secured together whilst allowing hinging movement about either of the pivot centres 62 or 64.

In FIG. 4a, the hinge is shown opening about pivot centre 64, as the pivot centre 62b of the moving plate 55 is rotated away from pivot centre 62a of the fixed plate 52. In FIG. 4c, the hinge is fully closed and ready to be opened about either pivot centre 62 or 64. In FIG. 4e, the hinge is shown closing about pivot centre 62, as the pivot centre 64b of moving plate 55 is rotated towards pivot centre 64a of the fixed plate 52. In FIG. 4b, the hinge is shown closing about pivot 64, and in FIG. 4f the hinge is shown opening about pivot 62.

In FIGS. 4a, 4c and 4e the distance between the cross-link pivot centres 62b-64a and 62a-64b is the same as the span between the pivot centres 62, 64 of the fixed and moving plates 52, 55. Since the hinge must always pivot about one or the other of these real pivot centres 62, 64, there is a sudden and immediate transition between opening about one pivot centre to opening about the other pivot centre. This arrangement is suitable for rotary crossflow devices, oscillating power generators, force generation devices and flow control devices.

In FIGS. 4b, 4d, and 4f, the distance between pivot centres 62b-64a and 62a-64b of the cross-link members 56, 58 is greater than the span between the pivot centres 62, 64 of the fixed and moving plates 52, 55. Because of the greater cross-link length, pivot centres 62a and 62b or 64a and 64b can never precisely coincide, so the hinge can never pivot precisely about any of these pivot centres. Instead it pivots about a virtual pivot centre which is a continually changing combination of the pivot centres 62a and 62b or 64a and 64b, and which continually changes position. When the hinge is substantially open about either pivot side 62, 64, the virtual pivot centre is located on that side and changes by a small inconsequential amount with further opening, but during transition from one side to the other, the virtual pivot centre changes position rapidly from one side to the other, providing a smooth transition between opening about one pivot side to opening about the other. This alternative is more suitable for oscillating propulsors. The hinge is shown closed in FIG. 4d.

Referring now to FIG. 7, the plural axis hinge 50 is mounted on the tacking foil 30 such that a virtual pivot centreline 80 connecting the two pivot centres 62, 64 of the hinge extends generally perpendicularly to a chord 35 of the foil in such a way that it falls close to the aerodynamic centre 85. In most cases, the pivot centreline 80 falls within a distance which is plus or minus 10 percent of a chord width away from the aerodynamic centre, although this distance may be considerably greater, particularly if a large hinge span is used.

For a plural axis hinge to operate effectively as a means of pitch control, the foil must be mounted to the hinge in such a way that it balances at the design AOA. In the present embodiment, this is achieved by firstly choosing the design AOA at which the foil will aim to operate. The resultant lift-drag force 87 acting on the foil 30 at this AOA has a line of action extending through the aerodynamic centre 85 of the foil. The windward pivot centre 62 with respect to the oncoming flow direction is shown in FIG. 7. The foil will be balanced about the windward pivot centre 62 at the design AOA, if the position of the pivot centre 62 is arranged to coincide with the line of action of the resultant lift-drag force. The leeward pivot centre 64 at the opposite side of the foil is symmetrically located with the windward pivot centre 62. However, in other embodiments this need not necessarily be the case.

The skilled person in the art will note that the direction of the resultant lift-drag force depends on the foil's lift-drag ratio and the direction of the apparent flow but is unaffected by the speed of the apparent flow. During rotation, the speed of the apparent flow is always changing, continually changing the magnitude of the resultant force, but because the line of action of the resultant always acts through a pivot centre at the design AOA, a foil will always balance at that AOA, regardless of the apparent flow speed encountered, and without further need of a sophisticated external control system. It is this attribute which makes fluid dynamic pitch control using a plural axis hinge greatly superior to the single pivot types mentioned previously.

Rotary crossflow power generators require a brake or lock to maintain the generator in a stationary position whilst the current flows so that drive train maintenance etc. can be carried out. To minimise the size of this brake, it is desirable to reduce the stationary start up torque of the generator. This is achieved by limiting the hinge 50 to a maximum opening angle of about 30 degrees, which in turn limits the foil pitch, and the start up torque generated thereby. The limitation also beneficially reduces the gybing shock loads on the hinge during start up at low tip speed ratios.

The plural axis hinge 50 operates as a pitch control means in the following manner. In use, the rotary crossflow power generator 1 is submerged in a fluid flow such as a tidal flow. Fluid dynamic forces acting on the foils cause the generator 1 to rotate. As each foil 30 moves through a revolution of the generator, the speed of the flow experienced by it changes continually, and is influenced by factors such as the prevailing actual fluid flow speed, and the tangential speed of the foil. The direction of the flow experienced by each foil 30 also changes continually, alternating either side of the tangent to the arc of rotation of the foil.

FIGS. 8 to 10 illustrate a revolution of an airfoil of a rotary crossflow generator at a low tangential rotational speed relative to the actual flow speed, i.e., low tip speed ratio, as would occur during the start up phase of operation. The tip speed ratio is 0.5.

In FIG. 8, the airfoil 30 is a tacking foil and is shown at various positions during a revolution of the generator. The arrows in FIG. 8 show the apparent flow direction and speed experienced by the foil of this particular embodiment of the generator. It can be seen that, at this low tip speed ratio, the hinge is open for most of the cycle.

Referring now also to FIGS. 9 and 10, a revolution of a foil 30 of the rotor will now be described. Between 0 degrees and 20 degrees, the AOA of the foil is within the design AOA of 13 degrees, see FIG. 9. Thus the hinge 50 remains closed (FIG. 10) and the pitch of the foil remains at zero degrees, meaning that pitch control is not required. As the foil moves between about 20 degrees and 65 degrees, the hinge opens up gradually to the limit of 30 degrees (FIG. 10), increasing the pitch of the foil to maintain its AOA at the design AOA of 13 degrees.

Between 65 degrees and approximately 220 degrees the hinge limits the pitch of the foil to its widest limit of 30 degrees, and the changing apparent flow causes the AOA to become steadily greater than the design AOA of 13 degrees. In this upstream sector of the rotation between 20 and 180 degrees, the apparent flow direction has opened the hinge 50 about the windward pivot 62.

In the downstream rotation sector at just past 180 degrees the apparent flow direction is such that, what was the windward pivot 62 then becomes the leeward pivot 62, and the hinge is thus open about the leeward pivot for some time. At 195 degrees the apparent flow crosses the trailing edge of the foil, and the foil continues to be balanced about the leeward pivot 62, but in a potentially unstable way. At approximately 220 degrees, the changing apparent flow destabilises the foil about the leeward pivot 62 so that the hinge suddenly closes and re-opens about the opposite pivot 64 which then becomes the new windward pivot. The sudden destabilisation of the foil only occurs when the apparent flow direction crosses the trailing edge of the foil and is known as gybing, and for rotary crossflow power generators gybing only occurs at tip speed ratios less than 1.0.

The hinge remains fully open at the limit between 235 degrees and about 295 degrees, and the changing apparent flow causes the AOA to decrease steadily towards the design AOA of 13 degrees, which is reached at about 295 degrees. From about 295 degrees to about 340 degrees the hinge gradually closes, decreasing the pitch of the foil to maintain its AOA at the design AOA of 13 degrees once more.

At about 340 degrees, the hinge is once again fully closed and the foil AOA is within the limit of the design AOA so pitch control is no longer required. In the downstream sector of the rotation between approximately 230 degrees and 340 degrees, the apparent flow direction has opened the hinge 50 about the windward pivot 64.

At about 0 degrees the apparent flow direction crosses the leading edge 33 of the foil and the foil effectively tacks while the hinge remains closed. Because the hinge remains closed while this occurs, tacking has the potential to be a very smooth process, unlike gybing. The hinge remains closed until pitch control is required again at about 20 degrees.

Turning now to FIGS. 11, 12 and 13, a further revolution of a generator is described at an increased tip speed ratio of 2.0, as would occur at a low working speed. The apparent flow direction experienced by the foil during a revolution of the generator at this tip speed ratio is more tangential to the arc of rotation of the foil 30, as seen in FIG. 11, than it was at the lower tip speed ratio. As seen in FIGS. 12 and 13, the hinge remains closed and the foil's AOA remains within the design AOA of 13 degrees in the first 40 degrees of the revolution, and between 165 degrees and 195 degrees and then again between 320 degrees and 360 degrees.

At this tip speed ratio, the hinge 50 never reaches its opening limit, so through most of the revolution, the hinge opens by varying amounts, automatically adjusting the pitch of the foil to maintain its AOA at the design AOA of 13 degrees.

Furthermore, the apparent flow direction never crosses the trailing edge of the foil in the downstream sector of the revolution, and so the foil does not gybe and the hinge, when open, opens only about the windward pivot centre, which is pivot centre 62 in the upstream sector and pivot centre 64 in the downstream sector.

The skilled man will note that, because the plural axis hinge opens up only when the apparent flow striking angle exceeds the design AOA but remains closed otherwise, the varying optimum AOA requirement as described previously can be maintained throughout the revolution of a foil and under all conditions of the flow encountered.

Turning to FIGS. 14, 15 and 16, at a tip speed ratio of 3.0 as would occur at a normally working speed, the apparent flow direction experienced by the foil is even more tangential to the arc of rotation of the foil such that pitch control is required through the revolution only at 55-150 degrees and 210-305 degrees. During these parts of the revolution, the hinge 50 opens about the windward pivot centre which is pivot centre 62 in the upstream sector and pivot centre 64 in the downstream sector and never opens more than about 6 or 7 degrees.

In this mode of operation, although a pitch angle of 6 or 7 degrees may seem very small, it can represent a potential 40% increase in power over a fixed pitch generator at this tip speed ratio.

For any given fluid flow speed, the power output of the generator increases as the tip speed ratio increases up to a maximum of about 5.0. At the higher fluid flow speeds anticipated, this creates very high apparent flow speeds and lift forces on the foils, which can easily damage the foils by excess loading or cavitation. It is therefore important to prevent over-speeding of the generator. Because a plural axis hinge is a wholly independent entity with no additional external control system, control over the rotational speed of the generator is achieved by controlling the power take-off load imposed on the rotor shaft.

As noted previously, tacking has the potential to be a very smooth process, but with an un-aided hinge this is not always the case. Shortly before the foil is due to tack, the hinge closes. When the hinge closes, the AOA of the foil is at the design AOA, and the foil is still balanced about the windward pivot, (i.e., with no moment about that pivot). But when the hinge closes, the foil also becomes free to pivot about the leeward pivot. If the arrangement is such that the direction of the resultant lift-drag force 87 generates a moment 88 about the leeward pivot 64, with a direction which tends to open the hinge as seen in FIG. 7, the foil will suddenly pivot about the leeward pivot, and quickly swing to a very high (stalled) AOA, (normally about 25 degrees). Surprisingly, the foil balances stably in this position. This continues for a short time while the generator rotates, until the changing apparent flow direction causes the leeward pivot to become the windward pivot once more, and the foil may balance correctly again.

This sudden undesired pivoting about the leeward pivot, hereinafter referred to as "leeward stall", creates considerable drag, which is very detrimental to performance and must be avoided, reduced or prevented. Leeward stall may also be a hazard after the foil has tacked while the hinge is still closed. In this case, the opening moment is about the opposite pivot, and leeward stall may thus occur in the opposite direction.

The direction of the moment about the leeward pivot may tend to open the hinge about the leeward pivot as above, or it may tend to keep it closed, or there may be no moment. This depends on the position of the foil's aerodynamic centre 85 (FIG. 7) relative to the pivot centreline's crossing point 89 with the foil chord 35. If the aerodynamic centre 85 lies upstream of the crossing point 89, the moment's direction 88 tends to open the hinge; if the aerodynamic centre lies downstream, the moment's direction tends to keep the hinge closed 85; and no moment has no effect.

The position of the aerodynamic centre 85 with respect to the crossing point 89 depends on the lift-drag ratio of the foil at the design AOA. There are a number of variables, but generally speaking, low design AOAs (less than 5 degrees) produce low lift-drag ratios, place the aerodynamic centre downstream, and avoid leeward stall. But higher and more useful design AOAs produce higher lift-drag ratios, place the aerodynamic centre upstream, and promote leeward stall.

The hinge of the present embodiment may be supplied with a pair of dampers as seen in FIG. 17. The dampers are used to ease the shock loads on the hinge at tip speed ratios at which gybing occurs. The dampers 70 comprise a pair of hydraulically actuated rods 70a, 70b. The distal end of rod 70a is attached to pivot centre 62 of the movable component of the hinge and the distal end of rod 70b is attached to pivot centre 64 of the movable component of the hinge. The rods 70a, 70b slide within hydraulic cylinders 71a, 71b which may be affixed to the fairing 60 on the fixed component side of the hinge (as shown). Alternatively, the orientation of the dampers may be reversed such that the hydraulic cylinders 71a, 71b may be affixed to a fairing on the movable component of the hinge (not shown). The dampers may also be used to limit the opening extent of the hinge defined by the length of the damper rods, although other limiting means may be employed.

The dampers may provide a damping effect at a varying rate. To ease the shock loads on the hinge, damping is mainly required as the hinge reaches its fully open or closed positions. Between these positions, there should ideally be little or no damping effect so as to minimally influence the balancing sensitivity of the hinge.

The hydraulic damper rods may be actuated by any appropriate means.

In an embodiment, no specific actuation means of the dampers is required, and leeward stall may be alleviated by the presence of the dampers. Slowing the rate at which the hinge may open after it has closed, also slows the rate at which leeward stall may proceed. In the time that it occurs, slowing the process reduces its effect.

In a further embodiment, actuation of the damper rods may be delayed by a time delay device (not shown) such as a hydraulic or pneumatic device that is known in the art and commercially available. A time delay device is used to delay actuation of the damper rods between the time that the hinge closes and the time that the hinge is allowed to open once more. With such a delay, the hinge may be constrained from opening until the hazard has passed, and leeward stall may thus be prevented.

In a yet further embodiment, a directional vane 72 (seen in FIG. 18) is employed to actuate the damper rods. The directional vane is used to control a rotary valve 73 (FIG. 18) which acts as an automatic selector to determine which of the rods 70a, 70b is to be actuated, and hence which of the pivot centres 62, 64 the hinge may pivot about. In this way, leeward stall may also be prevented. It is envisaged that in place of a rotary valve, the directional vane 72 may be used to control another type of valve, for example a linear valve. The rotary valve 73 (or linear valve or other type of valve) and directional vane 72 can be used in conjunction with the time delay device.

In an alternative embodiment to the valve and directional vane, a pressure-actuated switch (not shown) is used as an automatic selector to actuate the damper rods and determine which of the pivot centres the hinge may pivot about. In this way, leeward stall may also be prevented. A pressure actuated switch may respond to the alternating pressure differential experienced by a foil as the apparent flow strikes alternating faces of the foil during rotation. The pressure differential may be determined directly from the power or thrust generating foil mounted to a double axis hinge, or it may be determined indirectly from an additional skeg-like foil section (not shown) which is affixed to the fairing 60 (FIG. 2) specifically for this purpose. A pressure actuated switch may also respond to other signals such as a rate of change of pressure as the apparent flow speed varies sinusoidally during rotation. The pressure actuated switch can also be used in conjunction with the time delay device to prevent leeward stall.

During use, the hinge 50 will be exposed to both axial and non-axial loads due to the lift and drag forces acting thereon and due to the buoyancy of the foil. Axial loading in particular can be high and may be accommodated by sufficiently sized marine bearings (not shown). Ideally the foils have near neutral buoyancy, so non-axial thrust loads are minimal and may be accommodated by magnetic bearings or other suitable form of bearing (not shown).

In an alternative embodiment of the hinge 150, seen in FIG. 5, the hinge cross-links 156, 158 are flexible. The transition from one pivot side to the other may be sudden and immediate if adjacent faces of both the fixed and moving components are flat (FIG. 5a), or the transition may be a gradual rolling process if one or the other (or both) of the adjacent faces are convexly curved (FIG. 5b). The flexible cross-links 156, 158 are made of a suitable fabric, plastic or natural or other appropriate material. The hinge is closed when the moving component of the hinge is aligned parallel with the fixed component.

Figure 3:
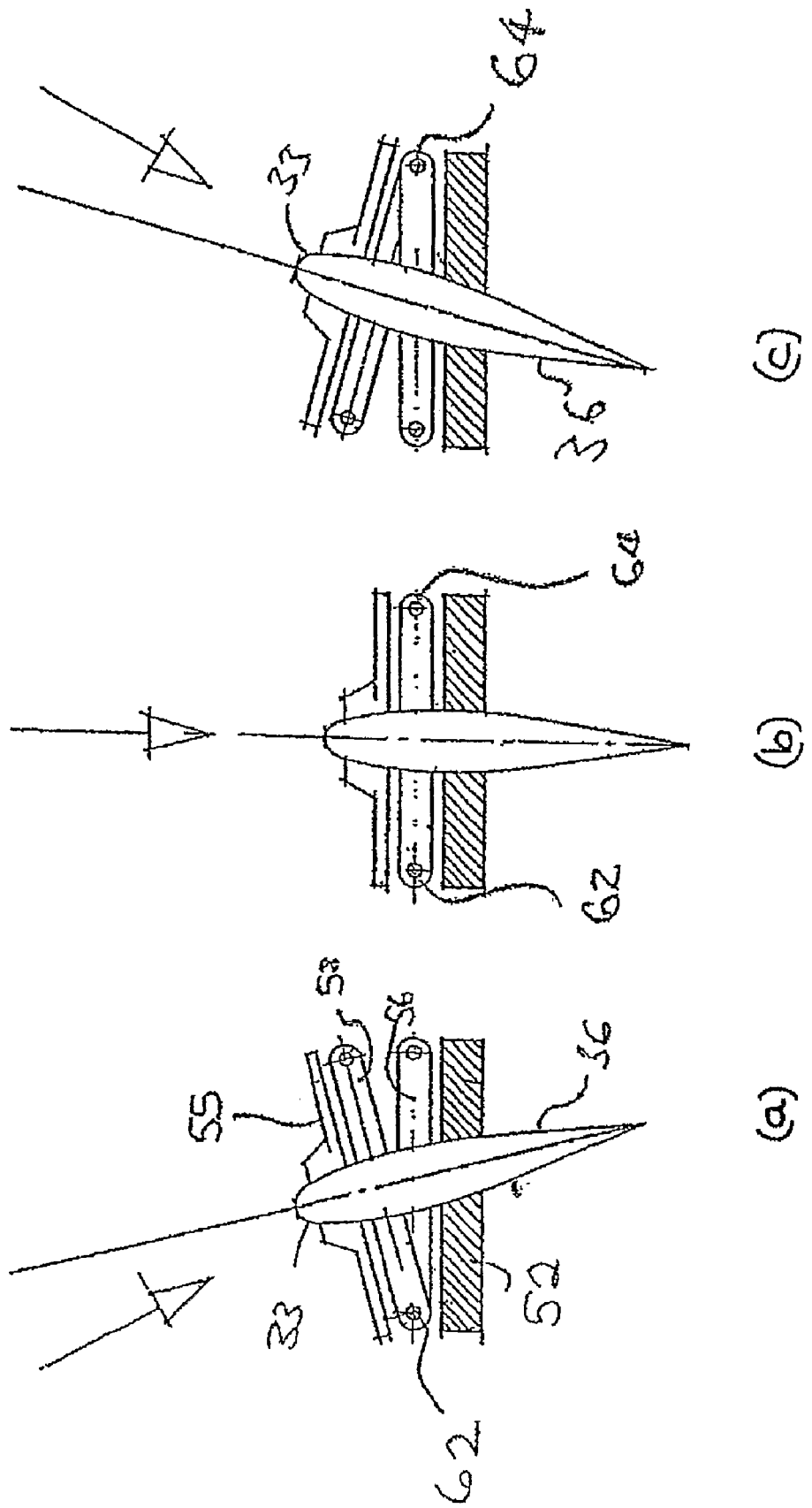
FIG. 3 shows schematic views of a tacking foil mounted on a plural axis hinge in accordance with the invention, where a moving plate of the hinge is upstream of a fixed plate of the hinge.

In FIGS. 3, 4 and 5, only the minimum requirement of two cross-links are shown in each case. To strengthen the hinge, additional cross-links may be utilised in all cases where cross-links are employed which duplicate the pivot centres, dimensions, and actions of either of the two cross-links shown. This increases the hinge height, frontal area, and drag force produced by the hinge, but where a foil is pivoted on a single mid-span hinge for example, such strengthening may be required.

In a yet further embodiment of the hinge 250 seen in FIG. 6, no cross-links are used to secure the hinge plates together. Instead, the fixed plate 252 and the moving plate 255 are held together using a sliding latch mechanism 280. Referring to FIGS. 6a, 6b and 6c, FIG. 6a shows the hinge opening about pivot 264. FIG. 6b shows the hinge in a closed position and FIG. 6c shows the hinge opening about pivot centre 262. In this embodiment, the fixed plate 252 includes an elongated slot 281 cut into the plate between the pivot centres 262a and 264a. The fixed plate 252 further comprises a bracket 272 and 274 at each of pivot centres 262a and 264a respectively. The brackets 272 and 274 extend laterally away from the fixed plate 252 and each comprises a pair of parallel flat plates having slots 282, 284 respectively formed in an edge of the plates that faces the moving plate 255.

The brackets form one part of the two-part coupling and the slots 282, 284 are designed to receive pegs 263, 265 that are affixed to protrusions 292, 294 of the moving plate 255.

The protrusions 292, 294 extend laterally from the moving plate 255 at the location of the pivot centres 262b, 264b and are positioned to be receivable between the pair of flat plates of the brackets 272, 274 when the hinge closes about either one of pivot centres 262, 264, or is closed about both pivot centres 262, 264 (FIG. 6b). The pegs 263, 265 extend along a pivot axis of each of the pivot centres 262, 264 such that they extend from either side of the protrusions 292, 294. The pegs 263, 265 are locatable within the slots 282, 284 of the brackets 272, 274, providing the second part of the two-part coupling.

The sliding latch 280 consists of an elongated bar having distal lobes 283, 285 extending in the longitudinal axis of the latch at either end thereof. The latch 280 further includes a lateral lug 287 extending from a mid-point of the latch 280 and being locatable in the slot 281 of the fixed plate 252 such that it can slide within the slot 281 between a first position in which the distal lobe 285 holds the peg 265 in place in the slot 284 and in which the distal lobe 283 is clear of peg 263 allowing the hinge 250 to open about pivot centre 264 (FIG. 6a); and a second position shown in FIG. 6c in which the distal lobe 283 holds the peg 263 in place in the slot 282 and in which the distal lobe 285 is clear of peg 265 allowing the hinge 250 to open about pivot centre 262. In between these two extreme positions is a middle position in which the distal lobes 283 and 285 each hold pegs 263, 265 in place in the slots 282, 284 such that the hinge 250 is unable to open about either pivot centre 262, 264 (FIG. 6b) and remains closed.

In a still further embodiment of the hinge seen in FIG. 17, no cross-links are used to secure the hinge plates together. In this case, pegged protrusions on one plate are receivable within slotted brackets on the other plate as above, but instead of using a latch mechanism to hold together the fixed and moving components, two hydraulic dampers may be used for this purpose in addition to their previously described roles. To prevent both dampers being actuated simultaneously and the hinge coming apart, a hydraulic interlock (not shown) may be provided, which allows one or the other damper to be actuated but not both at the same time. Alternatively, an automatic selector, as described previously, may be used to actuate the damper rods and determine which of the pivot centres the hinge may pivot about.

The foil sections used with a rotary crossflow power generator may take the form of a thin flat blade, or a symmetric airfoil section as shown in the present embodiment or of a thin cambered blade or cambered airfoil section. Symmetric foils develop a pitching moment when their path through a fluid is cycloidal or curved. The pitching moment changes the desired AOA of the foil, and adds to its drag, but the moment can be reduced or eliminated by the use of cambered foils, which are arranged on the hinge such that the concave side of the foil's mean camber line faces the rotational centre. For high tip speed operation, cambered foils are ideally cambered to an extent of the radius of the generator, whereas for low tip speed operation, cambered foils are ideally cambered to an extent of 10-15 percent greater than the generator radius.

With a rotary crossflow power generator, normal operational conditions apply whenever the tip speed ratio is greater than 1.0.

In a further embodiment of the invention, the plural axis hinge 350 is mounted to a tacking foil of a rotary crossflow propeller or cycloidal propeller for use on a boat or other marine vessel. Unlike simple axial propellers, cycloidal propellers can direct their thrust in any direction, and are usually employed with low-speed tugs or ferries, requiring high manoeuvrability. With these, the propeller normally operates at low pitch and at high tip speed ratios greater than 1.0. The propeller of the present embodiment is a cycloidal propeller of the trochoidal type and is designed for use with higher speed vessels such as container ships, etc. Trochoidal propellers normally operate at high pitch and low tip speed ratios less than 1.0.

A schematic of the rotation sequence of a trochoidal propeller 300 is shown in FIG. 19(a) at a tip speed ratio of 0.8, as would occur at a cruising speed of a vessel. The hinge 350 is mounted pivotally 353 to the end of the support arm 320 such that a transverse axis 351 of the hinge remains aligned in accordance with the desired direction of thrust. While the desired direction of thrust remains unchanged, the alignment of the hinge remains constant throughout a revolution of the propeller. The hinge must therefore rotate in its pivot 353 as the propeller rotates to maintain the alignment.

Under normal operation, the transverse axis 351 of the hinge is closely aligned with the desired direction of thrust. In FIG. 19a, the vessel is travelling straight ahead to the left, with forward thrust, and the transverse axis of the hinge is also aligned with the direction of travel, with the foils generating maximum lift and minimal drag.

As with the rotary crossflow power generator, the plural axis hinge 350 is used as a means of automatic pitch control of the foil 330 and is effected in a similar manner as described in the embodiment of the rotary crossflow power generator. As before, a moving plate 355 of the hinge 350 is mounted upstream of a fixed plate 352. The fixed plate 352 is pivotally mounted to the end of the support arm whilst the foil 330 is affixed to the moving plate 355. In this embodiment, the hinge 350 is limited to opening up to 45 degrees to allow the foil to operate at an optimum AOA throughout the revolution of the propeller.

In FIGS. 19a and 19b, the propeller arm or helm 333 controls the alignment of the hinge 350, through a full 360 degree range of adjustability. Adjustment of the arm 333 produces a corresponding adjustment of the alignment of the hinge 350, and hence the direction of thrust. This is achievable using a belt and pulley or gear arrangements (not shown). In this way, the propeller can generate thrust in a reverse direction or at an angle to the forward or reverse direction.

FIG. 19b shows the rotation sequence of the propeller in reverse thrust, at a cruising tip speed ratio of 0.8. At this cruising speed, reverse thrust of the propeller is accomplished by setting the foils at 90 degrees to the direction of travel, to produce the maximum drag. To achieve this, the helm must be turned through 135 degrees, as the hinge remains at its widest limit of 45 degrees throughout a revolution of the propeller, and thus accounts for the difference.

Reverse thrust shows that the transverse axis of the hinge is not always aligned with the desired direction of thrust, with a difference in this case of 45 degrees. In fact, the alignment difference increases as the hinge is turned. This is because the foils are used in two ways: to generate lift and to produce drag. When the transverse axis of the hinge is set straight ahead at 0 degrees, the foils are used to generate maximum lift with minimal drag and the direction of thrust is aligned with the transverse axis of the hinge. As the hinge is turned, the foils generate decreasing lift with increasing drag, and the direction of thrust changes by a greater amount than the hinge is turned. When the hinge is turned through 135 degrees, little lift is generated—mainly drag, and full reverse thrust is achieved. The relationship is not linear, with little difference between them for small hinge turning angles (less than 20 degrees), as used for normal steering manoeuvres.

With a rotary crossflow power generator, as the operational speed of the device increases so does the tip speed ratio. But with a trochoidal propeller, the obverse is true, namely: as the operational speed of the vessel increases, the tip speed ratio decreases. Gybing also occurs with trochoidal propellers, but with these, it occurs at all tip speed ratios greater than 1.0.

As with the rotary crossflow power generator, hydraulic dampers (not shown) may be used to reduce the shock loads on the hinge 350. This is especially important for a propeller as at most speeds up to cruising speed, the foil gybes once per revolution and the shock loads can be substantial. Whereas a rotary crossflow power generator can accelerate very quickly through the gybing stage, the propeller must spend considerably longer at this stage before cruising speed can be reached. With the propeller, hydraulic dampers may also have a varying damping rate, and leeward stall is also a hazard which may be reduced or prevented by any of the methods employed with the rotary crossflow power generator.

Since the propeller's foils follow a cycloidal or curved path through the fluid, the foils may be cambered as with a rotary crossflow power generator. However, thin flat blades or symmetric foil sections can also be used.

The propeller can have either a vertical or a horizontal rotation axis. A vertical axis propeller has the potential for a larger propeller diameter which can be an advantage if a large centrifugal force is envisaged. Where a horizontal axis propeller is used, an additional rudder is required for thrust vectoring in the horizontal plane.

With a rotary crossflow propeller normal operational conditions apply only if the hinge is turned through less than 20 degrees from the straight ahead position, the AOA of the foils is also less than 20 degrees with respect to the apparent flow direction, and the tip speed ratio is less than 1.0.

For best performance, rotary crossflow devices require that the plural axis hinge remains fully closed during a significant proportion of a revolution at normal operating speeds. This is most easily achieved by the use of hinge types which have a sudden and immediate transition from one pivot centre to the other. Therefore, a hinge with rigid cross-links of the type shown in FIGS. 4a, 4c and 4e or a hinge with flexible cross-links of the type shown in FIG. 5a may be used.

A plural axis hinge can also be mounted to an oscillating device such as an oscillating power generator, for example a fluid pump, or as an oscillating propulsor, for example a sculling oar or swimming aid. In FIG. 20, a plural axis hinge 450 is mounted to an oscillating propulsor 400, of a pivoted crossflow type having a reciprocating trailing arm 420 and a tacking foil 430 mounted at one end thereof. In use, the reciprocating arm 420 pivots about a pivot point 425 and moves in a reciprocating motion through the fluid.

As with rotary crossflow devices described above, a plural axis hinge 450 is used as a means of automatic pitch control of the foil 430 during a stroke, and is effected in a similar manner as described in the embodiment of the rotary crossflow power generator. Once again, the moving plate 455 is mounted upstream of the fixed plate 452 of the hinge 450.

In this instance, a plural axis hinge is furthermore utilised to aid the "end of stroke turning" of the foil 430. With reference to FIG. 21, "end of stroke turning" is effected as follows. During a stroke of a reciprocating arm 420, the foil 430 is pivoted and balanced about the windward pivot 462. At the end of the stroke, the direction of travel of the reciprocating arm is reversed, and the flow strikes the opposite side of the foil. What was the windward pivot now becomes the leeward pivot, and the changed apparent flow direction produces a moment about this pivot, which turns the foil to face towards the new apparent flow. In this way the foil turns naturally with the changing apparent flow direction as it would if balanced around a single pivot located at the aerodynamic centre of the foil.

The plural axis hinge also aids the end of stroke turning. When the direction of travel of the foil is reversed, the moment about the leeward pivot 464 shown in FIG. 21a is greater than it would be about a single pivot located at or near the foil's aerodynamic centre, thus aiding the turn. As with rotary crossflow devices, the hinge opening needs to be limited, in this instance to about 60 degrees.

The hinge 450 shown in FIG. 20 is of the type that has a sudden and immediate transition from one pivot centre 462 to the other pivot centre 464 and has rigid cross links 456 and 458. This will stress the hinge components at the "end of stroke turning" and cause a jerky motion in operation. This may be alleviated by the inclusion of one or more dampers as employed by rotary crossflow devices. This may alternatively or furthermore be alleviated by utilising a hinge type which allows a gradual transition from one pivot centre to the other. Such a hinge type with rigid cross-links is shown in FIGS. 4b, 4d and 4f, and with flexible cross-links is shown in FIG. 5b.

A plural axis hinge can also be used with a linearly 500 or axially oscillating propulsor 500 or with a crossflow leading arm propulsor 600 or a crossflow seesaw arm propulsor 700 as shown in FIG. 22. A plural axis hinge can further be used with shunting foils for any of these oscillating devices, and FIG. 23 shows a crossflow trailing arm oscillating propulsor. In this embodiment, the required plural axis hinge opening action is different for pitch control (FIG. 23a) than for end of stroke turning (FIG. 23b) thus the plural axis hinge can be used to control one or the other but not both at the same time.

With an oscillating propulsor, normal operational conditions apply only if the direction of applied thrust is the same or approximately the same as the travelling direction of the propelled entity.

In a still further use of the invention, a plural axis hinge is mounted on either a tacking foil or a shunting foil of an oscillating power generator, for example a fluid pump. The pressurised pump flow could be used to drive a rotary turbine and electrical power generator as is well known in the art.

Where a shunting foil is used, the hinge 850 is mounted with the pivot centreline 880 parallel with the foil chord such that the pivot centreline 880 is offset from the chord line to one side or other of the foil 830 (FIG. 24).

The fixed plate 852 of the hinge 850 is connected to a supporting arm 820 of an oscillating power generator 900 as seen in FIG. 26. The moving plate 855 of the hinge 850 includes a bracket upon which is mounted a shunting foil 830. The hinge shown is of the type that has rigid cross-links 856 and 858.

A shunting foil 830 is designed such that the leading and trailing edges alternate to ensure the side of the foil facing the generally higher fluid pressure always remains the same side and the side facing the lower fluid pressure also always remains the same. Hence the foil can "shunt" and swap its edges to achieve this. As with a tacking foil 30 (FIG. 7), a shunting foil 830 (FIG. 25) will be balanced about the windward pivot centre 862 at the design AOA, if the position of the pivot centre 862 is arranged to coincide with the line of action of the resultant lift-drag force 887. So the method of balancing an uncambered shunting foil 630 is the same as has been described above for the tacking foil 30 with the exception that where the pivot centres of the tacking foil 30 are disposed either side of the foil chord, with the shunting foil 830 both pivots are disposed on the same side of the foil such that the windward pivot centre 862 and the leeward pivot 864 are disposed symmetrically either side of a transverse centreline 890 of the foil 830 (FIG. 25).

Shunting foils having a small amount of camber can be balanced with a small adjustment of the location of the pivot centres 862 and 864, to compensate for the camber generated pitching moment. Additional stabilizing measures (not shown) may be necessary to balance high camber foils.

In an embodiment of FIG. 26, an oscillating crossflow power generator 900 employs a reciprocating trailing arm 920 that pivots about a pivot point 925 with a reciprocating motion.

The fixed plate 952 of the plural axis hinge 950 is mounted to the free end of the reciprocating arm 920. A shunting foil 930 includes a bracket which is affixed to a moving plate 955 of the hinge 950 such that a chord thereof lies substantially parallel to the virtual pivot centreline 980. The plural axis hinge 950 can be used for automatic pitch control of the foil and/or automatic end of stroke turning. At the end of the stroke, the hinge is designed to close as seen in FIG. 27 so that the foil loses balance and swings around to its new position on the opposite stroke.

During a stroke of reciprocating arm 920, the foil 930 (FIG. 27a) is pivoted and balanced about the windward pivot 962, and there are no moments about that pivot. Towards the end of the stroke, the hinge 950 is designed to close. When the hinge closes, the moments about the leeward pivot 964 are greater than the zero moments about the windward pivot 962 such that the foil 930 turns, changes pivot centres and pivots about the leeward pivot centre 964 (FIG. 27b). The foil continues to swing around until it reaches its design AOA, and generates a lift force in the opposite direction thus driving the reciprocating arm the opposite way on the return stroke. In this process, what was the leeward pivot 964 becomes the windward pivot 964 until the end of the next stroke when the foil 930 will turn again.

The skilled person in the art will note that the device must be designed such that the hinge 950 closes at the desired position to end each stroke. This is a matter of geometry and the device may incorporate additional geometric components to ensure that the hinge closes at the desired position. For example, as the reciprocating arm 920 moves through a stroke, the orientation of the hinge mounting may need to move by a different amount to achieve hinge closing. This can be arranged by the use of e.g. non-parallel plural arms (not shown), or other appropriate means.

As with oscillating propulsors, it may be advantageous to limit the opening of the hinge to about 60 degrees. End of stroke turning can be a very rapid action, unduly stressing the hinge at its opening limit. This may be alleviated by the use of dampers as with rotary crossflow devices.

The plural axis hinge can also be used with an oscillating power generator employing equivalent arrangements to those shown in FIG. 22 for an oscillating propulsor. Thus the plural axis hinge can also be used with a linearly or axially oscillating power generator or with a crossflow leading arm power generator or a crossflow seesaw arm power generator. As above, to effect these arrangements is a matter of geometry within the capability of the skilled person and the device may incorporate additional geometric components to ensure that the hinge closes at the desired position. This can be arranged by the use of e.g. non-parallel plural arms (not shown), a belt and unequal pulley means (not shown) or other appropriate means.

In most design configurations and tip speed ratios, leeward stall is not normally a hazard with oscillating devices, but in extreme cases where it may be a hazard, it may be countered by any of the means employed for rotary crossflow devices.

Where a tacking foil is used with an oscillating device, it may take any of the forms usable with the rotary crossflow power generator. If the tacking foil is cambered, the camber of the foil must alternate in direction according to the direction of the apparent flow, and the foil may be formed of a flexible material such as rubber, flexible plastic or other appropriate material. Where a shunting foil is used with an oscillating device, it may be formed as a thin flat plate, or symmetric lenticular section or as a thin cambered plate or cambered lenticular section.

With an oscillating power generator, normal operational conditions apply at all times that the device is in use.

In a still further embodiment, the plural axis hinge is used as a pitch control device on a force generation device or a flow control device in a fluid flow of varying direction such as a tidal flow.

In the embodiment of FIG. 28, a plural axis hinge 1050 is mounted to a shunting foil 1030 which is used to generate downforce on a device. The device could be an oscillating power generator installed on the seafloor, in which the downforce produced by the airfoil is used to counter the very large drag forces acting on the generator on the seabed. The shunting foil 1030 is mounted to a base 1020 of a generator 1000. In FIG. 28*a*, the plural axis hinge 1050 is shown opening about the leeward pivot centre 1064, pitching the foil to a negative AOA relative to the oncoming flow direction shown by the arrow, thereby inducing a downforce on the airfoil. The shunting foil 1030 is cambered to produce additional downforce over a non-cambered airfoil. A pair of stops 1040 is positioned on the base 1020 directly beneath the shunting foil 1030. The stops 1040 limit the angle of pitch of the airfoil 1030 to a design AOA as is desired, although other limiting means may be used. So the foil 1030 does not need to be balanced as with rotary and oscillating devices. In this instance therefore, the pivot centreline of a plural axis hinge does not need to be offset from a chord of the shunting foil and may, if sufficient pivot span is provided, be positioned so as to be collinear with a chord of the shunting foil, as shown in FIG. 28.

In FIG. 28*b*, the tidal flow is slack and has no prevailing direction, and accordingly the hinge 1050 closes by the action of the airfoil 1030 which has slight positive buoyancy, so that it rests at a zero angle of pitch. The buoyancy thus acts as a centering force. In FIG. 28*c*, the tide has turned as shown by the arrow. The hinge 1050 now opens about the leeward pivot centre 1062, and the airfoil 1030 is accordingly pitched again at a negative AOA relative to the changed flow direction. The stop 1040 limits the angle of pitch of the airfoil 1030 to the desired AOA.

In some configurations of camber, hinge span and offset of the hinge 1050 from the foil 1030, the foils may be turned by the action of the changing flow direction alone and no centering force is required. FIG. 29*a* shows a schematic example of a hinge having a larger offset distance from the airfoil. However, in many cases particularly when a high camber is used, a foil will not be turned naturally by the changing flow alone and it is necessary to counter the pitching moment using a further centering force.

The centering force, where necessary, is used to close the hinge and return the foil 1030 to a zero pitch angle when the flow stops. From a zero pitch angle the foil 1030 can more easily generate the required lift and drag moment to turn once again to a negative AOA relative to the changed flow direction.

In an alternative embodiment of a force generation device or flow control device, the hinge 1150 is a single axis hinge having a single pivot centre as shown schematically in FIG. 29*b*. The hinge 1150 operates in a similar manner to the plural axis hinge 1050, with the exception that to provide a centering force, the foil buoyancy should be slightly negative.

With a force generation device, if the force to be generated by the foil is a lift force rather than a downforce, the foil buoyancy is reversed. If the force to be generated is a side force, an alternative means of providing the centering force such as the use of a spring or other appropriate door or gate closing means may be necessary. In all cases of force direction, the centering force may also be provided by a hydraulic ram.

A plural axis hinge may also be used with a flow control device 1210 as shown in FIG. 30. The purpose of a flow control device 1210 is to modify the speed and direction of the flow within the vicinity of the device. In an embodiment, a single flow control device may be used whenever such alternating flow modification was required.

In a further embodiment, a pair of flow control devices is used to provide a duct within which a rotary crossflow power generator is installed. Referring to FIG. 30*a*, a rotary crossflow power generator 1200 is shown in plan view. The rotary crossflow power generator is installable in a tidal flow. The generator may be a single standalone unit, or it may form part of a plural number or array of generators. A pair of flow control devices includes a pair of shunting foils 1230*a* and 1230*b* provided on either side of the generator 1200 and in close proximity thereto, each shunting foil 1230 being mounted on a plural axis hinge. The foils 1230 are mounted such that a virtual pivot centreline 1280 extending between the pivot centres 1262 and 1264 of the hinge 1250 lies substantially parallel to a chord of the airfoil. The foils 1230 are cambered, and are positioned either side of the generator such that a convex side 1233 of each foil faces towards the rotary crossflow generator.

In addition to the camber, the AOA of each of the foils determines the shape of the duct. It is generally desirable that the duct is wider at the downstream exit of the duct than at the upstream inlet, with respect to the oncoming flow direction, in order to increase the flow rate through the generator. Thus in FIG. 30a, the hinge 1250a opens about the downstream pivot centre 1264a to pitch the foil 1230a to a negative AOA whilst the hinge 1250b opens about the downstream pivot centre 1264b to pitch the foil 1230b to a positive AOA to achieve the diffuser shape. As with the earlier force generation devices, limiting means can be used to limit the angle of pitch and AOA of the airfoils.

In FIG. 30b, there is no prevailing flow direction, the generator is stationary, and a centering force has closed the hinges and returned the foils to a zero pitch angle. As with force generation devices, flow control devices may require any of the centering force means suitable to their vertical/horizontal orientation as described previously.

In FIG. 30c, the tide has turned such that the water is flowing in the opposite direction than in FIG. 30a. In order that the duct is shaped as a diffuser so as to entrain the flow through the generator, the orientation of the foils 1230 has been reversed. This is effected simply by the plural axis hinges 1250a, 1250b which respond to the fluid dynamic forces acting upon the foils. The pivot hinge 1250a now opens about the pivot centre 1262a which has now become the downstream pivot centre. The hinge 1250b opens about the pivot centre 1262b.

The generator 1200 and flow control devices 1210 may be part of a plural number or array of closely spaced rotary crossflow power generators in a tidal flow. In an embodiment, two flow control devices are provided in the gap between adjacent generators to create a venturi-like passage between them. In FIG. 30, the foil 1230b is located in close proximity to foil 1230c of the adjacent generator, such that the two foils create a venturi-like passage between them. Where provided, ducting is used to entrain the water flow through the array. Installing a venturi-like passage between generators may also/further enhance the flow through the array and alleviate a head of water building up between the upstream and downstream sectors of the array. For example, the static pressure on the generator side of a foil disposed in such an array may be greater than the static pressure on the venturi side. In other words, the downstream venturi flow may be faster than the downstream generator flow. When the faster venturi flow mixes with the slower generator flow, it will speed it up, and this will enhance the flow through the array. The skilled man in the art will note that the locations of the pivot centres can be designed to take advantage of the pressure field such that the limiting means hold the foils at the design AOA.

Like the force generating devices, the pivot centreline of a plural axis hinge may, if sufficient pivot span is provided, be positioned so as to be in line with a chord of the shunting foil. This may be advantageous if very narrow venturi-like passages are envisaged or constructional requirements demand.

The foils of the force generation devices and flow control devices described above may have positive camber as shown in FIG. 30, or negative camber or zero camber, and may be formed as a thin flat plate or a symmetric lenticular section or as a thin cambered plate or a cambered lenticular section. With the flow control devices, the hinge may be positioned within the venturi-like passage or outside of the venturi-like passage depending on the desired type of flow passage.

According to specific device design and fluid medium in which the airfoil is utilised, the airfoil may, in all aspects of the invention, be formed of a substantially rigid material such as rolled steel or a rigid composite, or the airfoil may be formed of a flexible material such as rubber, flexible plastic or sail cloth. Furthermore, an airfoil may be mounted to any number of hinges, which may be located at any position along the length of the airfoil or at an end of the airfoil. With non-axial devices, the airfoil may be mounted on a pair of hinges, each hinge located at an end of the airfoil, or the airfoil may be mounted on a hinge located at the mid-span of the airfoil.

It will be apparent to the skilled man, that due to the simplicity of the plural axis hinge, any of the devices embodying the invention may be further employed as devices without serious utility, such as children's toys, mobile sculptures or the like.

It will also be appreciated by the skilled man that the use of airfoils and rotary crossflow devices incorporating a plural axis hinge according to the invention enables crossflow device accessibility that has great benefits over the prior art solutions to pitch control of the foils. For example, because the plural axis hinge is mounted on the device perimeter and is a wholly independent entity, it requires no reference to or connection with the axis of rotation of the device. This in turn means that each end of the rotor shaft is free to be supported externally at each end thereof. Hence larger devices may be utilised. The absence of complicated machinery and control systems allows the device to be more easily installed or removed, which is a significant advantage where the device is to be used in a water current.

The invention claimed is:

1. An airfoil arranged for use in a fluid flow of varying direction relative to the airfoil, the airfoil being arranged on a plural axis hinge for automatic adjustment of the angle of pitch thereof, in which the plural axis hinge comprises a fixed component and a moving component, the moving component being pivotable under fluid dynamic pressure about each of a first pivot centre and a second pivot centre laterally spaced from the first pivot centre, to cause the hinge to open alternately during use about each of the first and second pivot centres, such that the hinge opens either about the first pivot centre or about the second pivot centre, the airfoil being disposed on the moving component for pivoting movement therewith.

2. An airfoil as claimed in claim 1 in which the plural axis hinge fixed component defines the first and second laterally spaced pivot centres.

3. An airfoil as claimed in claim 1, in which the position of each of the first pivot centre and second pivot centre is changeable with respect to the fixed component during opening of the hinge.

4. An airfoil as claimed in claim 2, in which the action of the moving component, during a transition between the hinge opening about one of the first pivot centre and the second pivot centre and the hinge being open about the other of the first pivot centre and second pivot centre, may be substantially immediate.

5. An airfoil as claimed in claim 2, in which the action of the moving component, during a transition between the hinge opening about one of the first pivot centre and the second pivot centre and the hinge being open about the other of the first pivot centre and second pivot centre, may be a gradual rolling movement.

6. An airfoil as claimed in claim 2 in which the moving component may be arranged to pivot about a plurality of intermediate pivot centers during transitional movement between the first pivot centre and second pivot centre.

7. An airfoil as claimed in claim 2 in which the plural axis hinge further comprises cross-links extending between the fixed component and the moving component.

8. An airfoil as claimed in claim 2 in which a latch mechanism is provided to secure together the fixed component and the moving component and to enable transition of the moving component between opening about the first pivot centre and opening about the second pivot centre.

9. An airfoil as claimed in claim 2, further comprising first and second hydraulic dampers connected to the moving component at each of the first and second pivot centres, the dampers being arranged to secure together the fixed component and the moving component and to enable transition of the moving component between opening about the first pivot centre and opening about the second pivot centre.

10. An airfoil as claimed in claim 1 in which the fluid is water.

11. An airfoil as claimed in claim 10 in which the water flows or moves and is tidal flow, river flow, orbital motion of water in waves, ocean current or the like.

12. An airfoil as claimed in claim 1 in which the airfoil comprises a leading edge and a trailing edge, and being arranged such that, under normal operational conditions of the device using the airfoil, the leading edge always faces an oncoming flow direction and the trailing edge always faces away from the oncoming flow direction.

13. An airfoil as claimed in claim 12 in which a pivot centerline of the plural axis hinge is defined as a virtual line passing through the first and second pivot centres, and in which the hinge is mounted to the airfoil such that, when the hinge is in a fully closed position, the pivot centreline is disposed substantially perpendicularly to a chord of the airfoil.

14. An airfoil as claimed in claim 1 in which the airfoil comprises opposing surfaces, and a leading edge and a trailing edge which are arranged to alternate during use thereof to ensure that a surface of the airfoil facing the generally higher fluid pressure always remains the same and the surface facing the lower fluid pressure always remains the same.

15. An airfoil as claimed in claim 14 in which a pivot centreline of the plural axis hinge is defined as a virtual line passing through the first and second pivot centres, and in which the hinge is mounted to the airfoil such that, when the hinge is in a fully closed position, the pivot centerline is disposed substantially parallel to a chord of the airfoil.

16. A rotary crossflow device for use in a fluid flow of varying apparent flow direction, the device comprising a rotor shaft aligned substantially perpendicularly to the fluid flow, at least one airfoil as claimed in claim 2 pivotally arranged in parallel with the rotor shaft, the airfoil being disposed in spaced relationship from the rotor shaft on a support connected to the rotor shaft.

17. A rotary crossflow device as claimed in claim 16 in which the device is a rotary crossflow power generator.

18. A rotary crossflow device as claimed in claim 16 in which the device is a rotary crossflow propeller.

19. An oscillating device for use in a fluid flow, the device comprising a reciprocating element and at least one airfoil as claimed in claim 2 arranged on the reciprocating element such that, as the reciprocating element is at its mid-stroke position and the hinge is in a fully closed position, a chord of the airfoil is disposed substantially parallel to the mean fluid flow direction.

20. An oscillating device for use in a fluid flow, the device comprising a reciprocating element and at least one airfoil as claimed claim 2 arranged on the reciprocating element such that, as the reciprocating element is at its mid-stroke position and the hinge is in a fully closed position, a chord of the airfoil is disposed substantially perpendicularly to the mean fluid flow direction.

21. An oscillating device as claimed in claim 19 in which the device is a power generator.

22. An oscillating device as claimed in claim 19 in which the device is a propulsor.

23. A force generation device for use in a fluid flow of varying direction, the device comprising an airfoil as claimed in claim 1 in which the airfoil comprises opposing surfaces, and a leading edge and a trailing edge which are arranged to alternate during use thereof to ensure that a surface of the airfoil facing the generally higher fluid pressure always remains the same and the surface facing the lower fluid pressure always remains the same.

24. A force generation device as claimed in claim 23 in which the plural axis hinge fixed component defines first and second laterally spaced pivot centres and in which the hinge includes a pivot centerline defined as a virtual line passing through the first and second pivot centres, and in which the hinge is mounted such that, when the hinge is in a fully closed position, the pivot centerline lies substantially parallel with a chord of the airfoil.

25. A force generation device as claimed in claim 23, provided adjacent a rotary crossflow power generator.

26. A flow control device for use in a fluid flow of alternating direction, the device comprising an airfoil as claimed in claim 1 and in which the airfoil comprises opposing surfaces, and a leading edge and a trailing edge which are arranged to alternate during use thereof to ensure that a surface of the airfoil facing the generally higher fluid pressure always remains the same and the surface facing the lower fluid pressure always remains the same.

27. A flow control device as claimed in claim 26 in which plural axis hinge fixed component defines first and second laterally spaced pivot centers, and a moving component that is pivotable about the first and second pivot centers, and the hinge includes a pivot centerline defined as a virtual line passing through the first and second pivot centers, and in which the hinge is mounted such that, when the hinge is in a fully closed position, the pivot centerline lies substantially parallel with a chord of the airfoil.

28. A flow control device as claimed in claim 26, provided adjacent a rotary crossflow power generator.

* * * * *